United States Patent
Watanabe et al.

(10) Patent No.: US 7,218,599 B2
(45) Date of Patent: May 15, 2007

(54) OPTICAL PICKUP

(75) Inventors: Yukio Watanabe, Kyoto (JP); Tetsuo Ueyama, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 514 days.

(21) Appl. No.: 10/868,597

(22) Filed: Jun. 14, 2004

(65) Prior Publication Data
US 2004/0252620 A1 Dec. 16, 2004

(30) Foreign Application Priority Data
Jun. 13, 2003 (JP) .............................. 2003-169960

(51) Int. Cl.
*G11B 7/00* (2006.01)
(52) U.S. Cl. ............................ 369/112.07; 369/112.12
(58) Field of Classification Search ............ 369/112.07
See application file for complete search history.

(56) References Cited

U.S. PATENT DOCUMENTS 5,648,951 A * 7/1997 Kato et al. ............. 369/112.07
6,418,095 B1 * 7/2002 Sano et al. ............... 369/44.32

FOREIGN PATENT DOCUMENTS

JP     2001-250250       9/2001
WO     WO 03/091999 A1   11/2003

* cited by examiner

*Primary Examiner*—Paul W. Huber
(74) *Attorney, Agent, or Firm*—Peter J. Manus; David G. Conlin; Edwards Angell Palmer & Dodge LLP

(57) ABSTRACT

Regional borderlines that are the borderlines between the first region and the second region on a diffraction grating of an optical pickup partially overlap a group of y-axis parallel borderlines that are borderlines between pattern A and pattern B that are parallel to a direction parallel to the y-axis.

12 Claims, 17 Drawing Sheets

Push-pull signal

Push-pull signal when the objective lens shifts

OPTICAL PICKUP

This Nonprovisional application claims priority under 35 U.S.C. § 119(a) on Patent Application No. 2003/169960 filed in Japan on Jun. 13, 2003, the entire contents of which are hereby incorporated by reference.

FIELD OF THE INVENTION

The present invention relates to an optical pickup, which records and reproduces information optically on and from information recording medium such as an optical disk, and more particularly relates to an optical pickup, which corrects an offset in a tracking error signal.

BACKGROUND OF THE INVENTION

Optical disks are used in many fields such as audio equipment, VCR, computers as an information recording medium that enables to record many information signals in the high density. In order to read out information signal, which has been recorded in micrometer unit, in the information recording medium such as an optical disk, it is necessary to accurately carry out tracking of a light beam with respect to a track on an optical disk. There are well-known various methods for detecting of a tracking error signals for carrying out the tracking (hereinafter referred to as TES).

One of the tracking methods is a difference push-pull method (hereinafter referred to as DPP method). According to the DPP method, an offset in TES, caused by a shifting of the object glass and by a tilting of an optical disk, is corrected by finding a difference between a push-pull signal (hereinafter referred to as a PP signal) of a main beam and PP signals of sub-beams. The main beam and the sub-beams are generated by a three-beam diffraction grating.

In the DPP method, in order to cancel an offset, a phase difference of sub-beam PP signals is set to 180° with respect to the main beam PP signal. However, in order to provide the phase difference of 180°, it is necessary to carry out respective position adjustments of the main beam and the sub-beams that are converged on the track on the optical disk. During the adjusting, it is necessary to carry out an accurate rotation adjustment or the like of the three-beam diffraction grating.

In view of the circumstances, the DPP method is improved, and a phase shift DPP method is proposed. In the phase shift DPP, the position adjustments of the main beam and the sub-beams converged on a track of an optical disk are omitted. This allows the simplification of adjustments during assembling of an optical pickup. The phase shift DPP is disclosed in Japanese unexamined patent publication No. 2001-250250 (Tokukai 2001-250250; published on Sep. 14, 2001).

As shown in FIG. 16, according to the phase shift DPP method disclosed in the Tokukai 2001-250250, laser light emitted from a light source 101 is converted to parallel light via a collimator lens 102, and is divided into a main beam 130, a sub-beam (positive first order light beam) 131, and a sub-beam (negative first order light beam) 132, via a diffraction grating 103. These three beams are converged onto a track on an optical disk 106 by an objective lens 105 after passing through a beam splitter 104. The light reflected from the optical disk 106 is further reflected by a beam splitter 104 via the objective lens 105, and is directed to a photo detector 108 (108A, 108B, 108C), via a collective lens 107.

As such, far field patterns of the reflected light of the main beam 130 and the sub-beams 131 and 132 are directed to a two-division photo-detectors 108A, 108B, and 108C.

Here, it is assumed that an original point is at a center of the beam, x-axis extends in a radial direction of the optical disk, and y-axis extends in a track direction. In the diffraction grating 103, a periodical structure of the grating grooves of the first quadrant has a phase difference of 180° from that of the grating grooves of the second through fourth quadrant. This causes the sub-beams 131 and 132, diffracted by the grating groove, to have a phase difference of 180° in the first quadrant. As such, as shown in FIG. 17(a), difference signals outputted from the two-division photo-detectors 108B and 108C, i.e., the PP signals 131 and 132 of the sub-beams are substantially zero (0) in their amplitudes, compared to the PP signal PP130 of the main beam, i.e., the difference signal from the two-division photo-detector 108A without phase difference.

The PP signals derived from the sub-beams 131, 132 are not detected regardless of the track position. Therefore, substantially the same differential PP signals are obtained when the sub-beams 131 and 132 are directed onto the same track where the main beam 130 is directed, and when the sub-beams 131 and 132 are directed onto a different track, respectively.

On the other hand, as shown in FIG. 17(b), as to an offset in TES caused by tilting of the objective lens 105 or the optical disk 106, the PP signals 130 and 131 (PP signal 132) have common mode offsets of $\Delta p$ and $\Delta p'$ in accordance with the light amount. As such, a differential PP signal 134 that has been subject to the cancellation of the offsets can be calculated and detected using the following formula.

$$PP134 = PP130 - k(PP131 + PP132) = PP130 - k \cdot PP133 \quad (1)$$

Note that a coefficient k in the formula (1) is for correcting the difference of the light intensity between (i) the zero order light main beam and (ii) the positive and negative first order light sub-beams 131 and 132. For example, when the ratio of the light intensity is expressed by zero order light: positive first order light (+): negative first order light (−)=a:b:b, the coefficient k satisfies k=a/(2b). Moreover, as shown in the formula (1), the PP signal 133 is the sum of the PP signals of the sub-beam 131 and the sub-beam 132.

In this way, the sum (the PP signal 133) of the sub-beam PP signals 131 and 132 has amplitude of 0 regardless of groove depth. Since the amplitude is thus 0 regardless of the position of the beams on the track, it is not necessary to carry out a position adjustment, such as the rotation adjustment of the diffraction grating, for the three beams. As such, it is possible to greatly simplify the assembling adjustment of the pickup.

However, in case of adopting an optical pickup utilizing a phase shifted diffraction grating, the offset sensitivity (lens shift signal) for the PP signals of the sub-beams that indicates a shifting of the objective lens (hereinafter referred to as lens shift) may not change linearly with respect to the lens shift of the objective lens.

More specifically, when center values of the of the PP signals of the respective amplitude (values corresponding to $\Delta p$ and $\Delta p'$ shown in FIG. 17 (b)) are used to evaluate an offset value for the lens shift, the lens shift signal may change as shown in FIG. 18. In other words, the lens shift signals for the main beam PP signals (a solid line in FIG. 18) change linearly, whereas lens shift signals for the sub-beam PP signals (a dotted line in FIG. 18) may change nonlinearly.

The nonlinear change in the lens shift signals of the sub-beam PP signals is attributed to structures around a border between regions, in the diffraction grating, that have different phases from one another. In other words, the lens shift signals of the sub-beam PP signals are easy to be affected around the border by an interference of the light beams that have passed through the regions having their respective phases and/or by a deviation of the grating groove around the border from a realistic design state etc. This causes nonuniformity of the amplitude of the lens shift signals of the PP signals of the sub-beams in accordance with position relation between regions around the border and a division line of the photo-detector (see reference numeral 108 in FIG. 16), thereby causing the lens shift signal to change nonlinearly with respect to the lens shift.

If a rapid change occurs in offset sensitivity of PP signals as described above, the correction of an offset in TES becomes inaccurate, then it becomes difficult to carry out better tracking servo with respect to an optical pickup. Thus, an optical pickup utilizing a phase shift diffraction grating leaves room for an improvement in reliability in tracking servo.

SUMMARY OF THE INVENTION

An object of the present invention is to restrain a change in sensitivity of sub push-pull signals with respect to objective lens shifting so as to provide an optical pickup with improved reliability in tracking servo.

An optical pickup of the present invention includes: (1) a light source for emitting a light beam; a converging element for converging the light beam onto an optical recording medium; (2) an optical diffraction element, that is provided between the light source and the converging element, for dividing the light beam into at least a main beam and two sub-beams; and (3) a photodetector section including light receiving elements for respectively receiving light beams divided by a parting line along a track direction of the optical recording medium, said light beams reflected from the optical recording medium, (a) the optical diffraction element including first concavo-convex patterns, each having a concavo-convex shape, provided in a direction perpendicular to the track direction, and second concavo-convex patterns, each having a concavo-convex shape which deviates from that of the first concavo-convex pattern, (b) the optical diffraction element further including at least first through third allocation pattern regions successively provided in the direction perpendicular to the track direction, the allocation pattern regions being classified in accordance with allocation patterns formed by at least one of the first and second concavo-convex patterns, and (c) when (i) a region borderline, extending parallel to the track direction, which is formed by an allocation pattern border section between the first and second allocation pattern regions provided successively, and (ii) each concavo-convex pattern border section between the first and second concavo-convex patterns overlap, the concavo-convex pattern border sections are provided so that at least one of (A) a linear overlapping section where the region borderline and a part of pattern borderlines in a pattern borderline group in the concavo-convex pattern border sections, each extending parallel to the track direction, overlap, and (B) a point overlapping section where the region borderline and at least one point of the concavo-convex pattern border sections overlap is formed.

Note that the photodetector section may be substituted for either a photodetector that directly detects the light reflected from the optical recording medium, or a photodetector that detects divided light obtained by dividing the reflected light with the use of a hologram or the like the reflected light.

With the arrangement, the optical diffraction element is formed so that the region borderline and part of the pattern borderlines in the pattern borderline group in the concavo-convex pattern border sections, each pattern borderline extending parallel to the track direction, overlap. Alternatively, the optical diffraction element is formed so that the region borderline and at least one point of the concavo-convex pattern border sections overlap. It should be noted that "a direction parallel to the track direction" includes a direction parallel to the track direction, and includes directions which fall in such a range that are regarded as substantially parallel to the track direction.

Luminous intensity of the optical diffraction element may largely fluctuate due to the interfering of the light beams passing through the concavo-convex pattern border sections or due to the shape of the concavo-convex pattern border sections. However, according to the optical diffraction element of an optical pickup of the present invention, the overlapping parts of the region borderline and the concavo-convex pattern border sections is reduced. As such, it is possible to avoid that the PP signals, from the light receiving element, in the tracking error signal largely change depending on whether or not (i) the light, among the diffracted light received by the light receiving element, which has passed through the overlapping parts, and (ii) the parting line of the light receiving element overlap each other. In other words, when the converging element is shifted in response to a tracking control so that the relative position of the converging element and the light receiving element deviate from a desired one, it is possible to avoid non-linear changes in the PP signals, i.e., the rapid increasing or decreasing of the PP signals occurred in response to the shifting of the converging element.

This permits of realizing of a good tracking servo control, thereby improving the reliability of the tracking servo control with respect to the optical pickup.

Additional objects, features, and strengths of the present invention will be made clear by the description below. Further, the advantages of the present invention will be evident from the following explanation in reference to the drawings.

DESCRIPTION OF THE EMBODIMENTS (Embodiment 1)

The following description deals with an embodiment of the present invention with reference to FIG. 1 through FIG. 7.

Figure 1A:
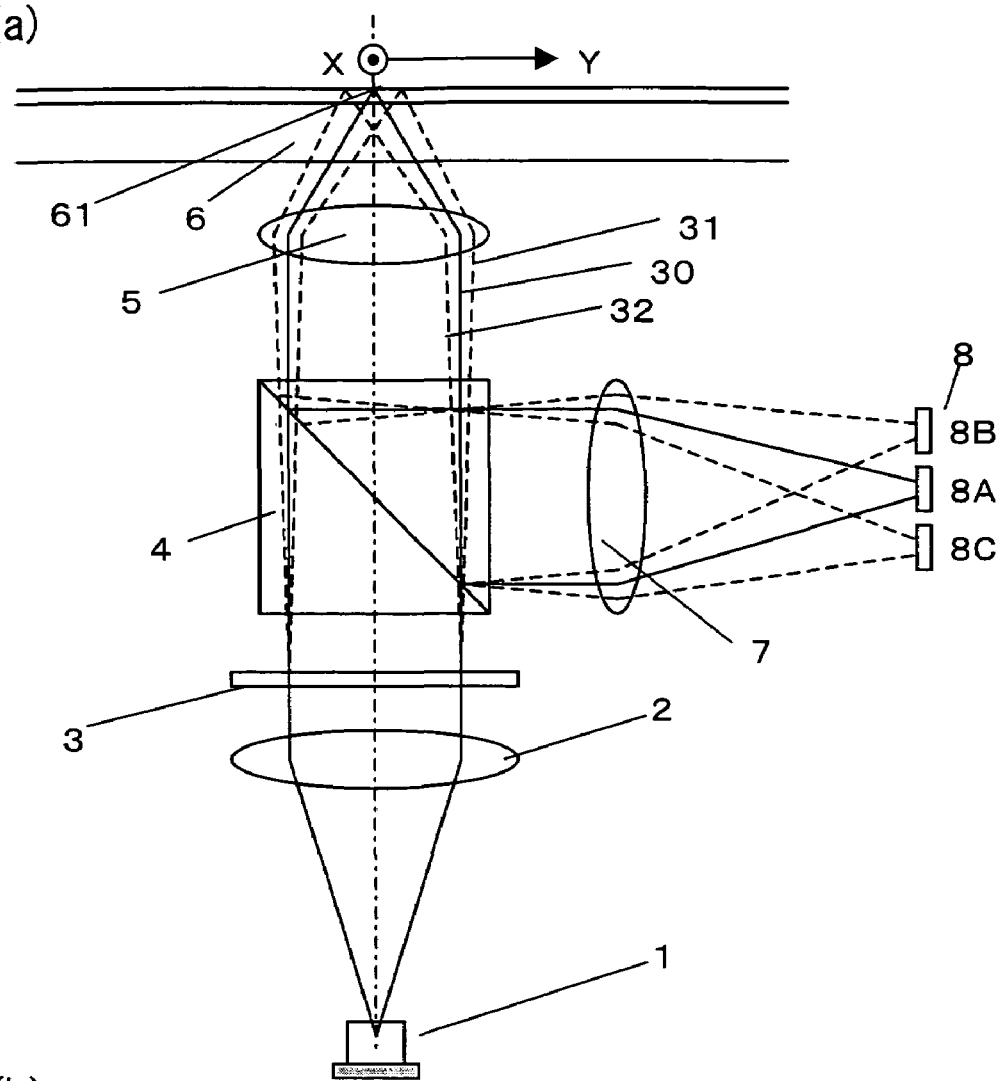
FIG. 1(a) is a schematic diagram of front elevation view showing a first embodiment of an pickup apparatus according to the present invention.
Figure 4:
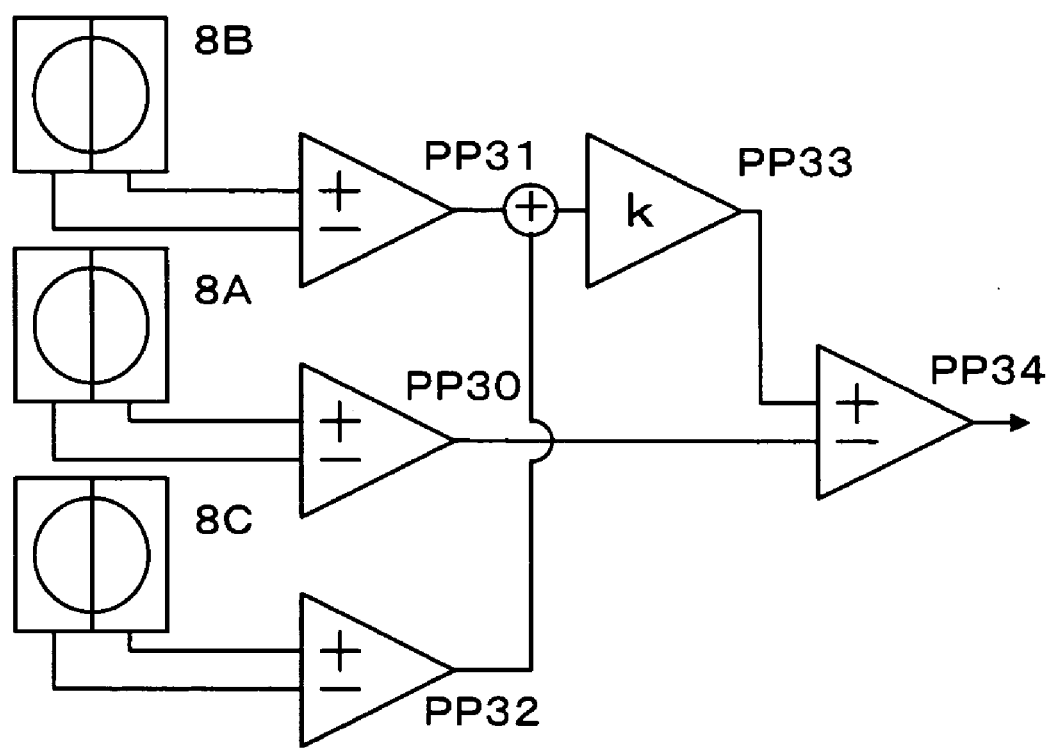
FIG. 4 is an explanatory diagram showing a photodetecting method of the pickup apparatus.

As shown in FIG. 1(a), a pickup apparatus (optical pickup) according to the present invention includes a light source 1, such as semiconductor laser, for generating a beam, a diffraction grating (diffraction element) 3 that divides the beam emitted from the light source 1 into three beams, i.e., a main beam (0th order light) 30 and two sub-beams—a sub-beam (+1st order light) 31 and a sub-beam (−1st order light) 32, an objective lens (collective element) 5 that collects the three beams divided on an optical disk (optic recording medium) 6, and a photodetector (a light receiving element and a photodetection section) 8 for detecting PP signals from light beams of the three beams respectively reflected from the optical disk 6. As shown in FIG. 4, the photodetector 8 includes two-division photodetectors (light receiving elements) 8A, 8B, and 8C. Each of the photodetectors 8A, 8B, and 8C has a parting line extending in a track direction of the optical disk 6. This allows a PP signal to be detected from each of the reflected light beams of the three beams.

The diffraction grating 3 is a transparent diffraction grating, and includes a concavo-convex surface (grating grooves) having a concavo-convex shape, as described later. The following description deals with how the concavo-convex surface of the diffraction grating 3 is arranged with the use of an x-y coordinate system. In the x-y coordinate system, it is defined that origin of coordinates is the center of a region on the diffraction grating 3 where a light beam passes through, an x-axis extends in a radial direction of the optical disk, and a y-axis extends in a track direction orthogonal to the x-axis.

Figure 1B:
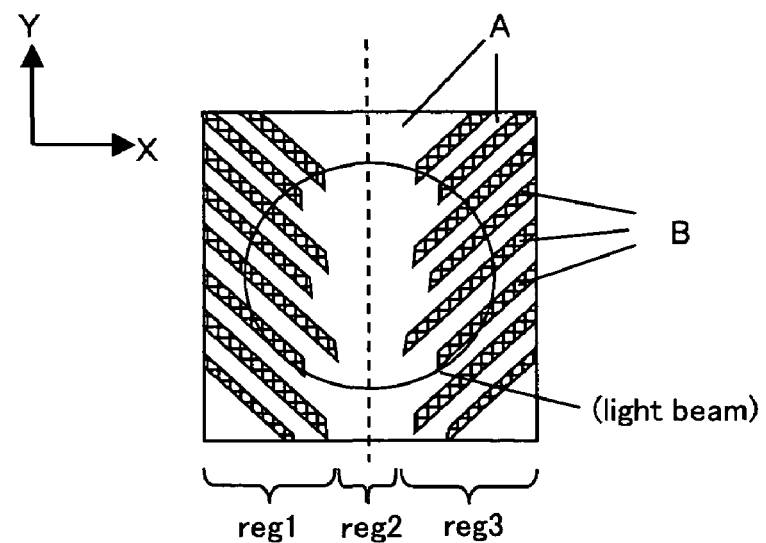
FIG. 1(b) is a plane view showing diffraction grating in FIG. 1(a)

As shown in FIG. 1(b), the diffraction grating 3 includes first grating patterns A (first concavo-convex patterns, hereinafter referred to as patterns A), and second grating patterns B (second concavo-convex patterns, hereinafter referred to as patterns B). The diffraction grating 3 includes three allocation pattern regions, i.e., a first region, a second region, and a third region (hereinafter referred to as reg1, reg2, and reg3, respectively) which are aligned in a direction perpendicular to the y-axis (i.e., in the track direction). The reg1 through reg3 of are distinguished by allocation patterns which are formed with the use of at least one of the patterns A and the pattern B. More specifically, in the present embodiment, the patterns A and B are formed alternately in a strip-manner with substantially an equal interval in the reg1 and the reg3, respectively. The pattern A is formed in the reg2.

As shown in FIG. 1(b), the patterns A and B in the reg1 and the reg3 are formed so as to be slanted at a predetermined angle with respect to the y-axis of the optical disk. In the reg1 and reg3, the patterns A and B are slanted in respective opposite directions, and are almost symmetrical with respect to the reg2. The reg1 and the reg3 are located at both sides of the region of the diffraction grating 3 where the light beam passes through. On the other hand, as shown in FIG. 1(b), the reg2 is located between the reg1 and the reg3, i.e., the central region other than the sides of the region of the diffraction grating 3 where the light beam passes through.

In the patterns A and B, concave sections (grooves) and convex sections (lands) that form concavo-convex surface (grating grooves) of diffraction grating 3 are alternately formed at substantially an equal interval, in a direction parallel to the x-axis. The grating grooves in the patterns A and B have a same interval. However, note that the relative positions of the grating grooves in the pattern A deviate by ½ pitch from those in the pattern B. In other words, the grooves and the lands in the pattern A correspond to the lands and the grooves, respectively, in the pattern B.

Thus, in the reg1 and the reg3, the patterns A and B are formed so that the relative positions of the grating grooves deviate from one another by ½ pitch, and the pattern A in the reg2 is formed at the same pitch as the pattern A in the reg1 and the reg3.

As shown in FIG. 1(b), around a borderline, in the reg1, between the reg1 and the reg2 (allocation pattern borderline section) as well as around a borderline, in the reg3, between the reg3 and the reg2 (allocation pattern borderline section), the concavo-convex surface is formed so that pattern border lines of the patterns A and B extend in a direction parallel to the y-axis. In other words, on the grating 3, the patterns A and B are formed so as to form at least pattern borderline (hereinafter referred to as y-axis parallel borderline), extending in a direction parallel to y-axis, between the patterns B and A. Thus, the y-axis parallel borderlines are formed between each of the patterns B formed periodically in the reg1 and each of the patterns A in the reg2, and between each of the patterns B formed periodically in the reg3 and each of the patterns A in the reg2, respectively. It should be noted that "a direction parallel to y-axis" includes a direction parallel to y-axis, and includes directions which fall in such a range that are regarded as substantially parallel to y-axis.

A pattern borderline group is constituted by y-axis parallel borderlines formed on pattern borderlines between each of the patterns B and each of the patterns A. As shown in FIG. 1(b), y-axis parallel borderlines in the pattern borderline group are arranged so as to deviate little by little from a line parallel to y-axis. In other words, on the diffraction grating 3, not all the y-axis parallel borderlines are allocated on a single line parallel to y-axis. Namely, some y-axis parallel borderlines are allocated on a single line parallel to y-axis, and the rest of y-axis parallel borderlines are allocated on other lines parallel to y-axis.

Thus, when defining borderlines in the reg1 to reg3 as regional borderlines, parallel to y-axis and connecting edges of the patterns B formed in the reg1 and the reg3, which are closest to the central axis of the grating 3 in a direction parallel to the y-axis (see dotted line in FIG. 1(b)), the regional borderlines, as described above, correspond to the straight lines that are parallel to y-axis. Thus, the regional borderlines and a part of y-axis parallel borderlines in the pattern borderline group linearly overlap (linear overlapping section).

In the pickup apparatus having the arrangement, a tracking error signal (TES) for accurately tracking of a light beam on a track of an optical disk is detected as follows.

As shown in FIG. 1(a), laser light emitted from the light source 1 is converted into parallel light by the collimator lens 2, and is divided into the main beam 30, the sub-beams 31 and 32 by the diffraction grating 3.

Note that the main beam 30, that is not diffracted by the diffraction grating 3, passes through the diffraction grating 3 without changing in the phase. On the other hand, the sub-beams (±1st order light) 31 and 32 are diffracted by the concavo-convex surface of the diffraction grating 3. so as to receive phase differences of ±180°, respectively. In other words, the sub-beams 31 and 32, diffracted by the concavo-convex surface of the diffraction grating 3, have phase difference of 180° between the diffraction from the pattern A and the diffraction from the pattern B. Thus, if no phase difference is added to the light diffracted from the pattern A, then a phase difference of 180° will be added to the light diffracted from the pattern B.

After passing through a beam splitter 4, the three beams, divided due to the respective phase differences, are converged onto a track 61 having a periodic structure on the optical disk 6 via the objective lens 5. Sequentially, the light reflected from the track 61 on the optical disk 6 enters into the objective lens 5 once again, is reflected by the beam splitter 4 via the objective lens 5, and is directed to the photodetector 8 (two-division photodetector 8A, 8B, 8C) by a converging lens 7.

Figure 2A:
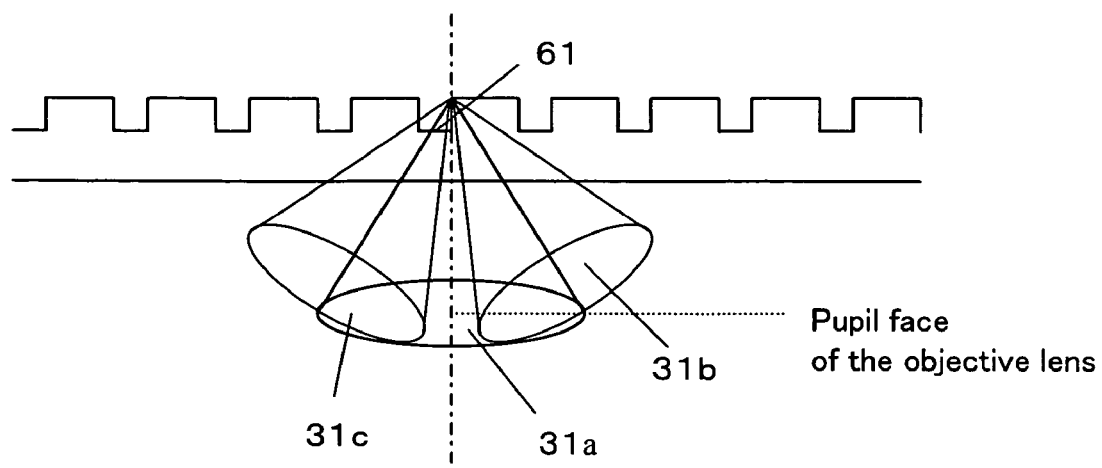
FIG. 2(a) is a front elevation view showing diffraction patterns of reflected beams from an optical disk.
Figure 2B:
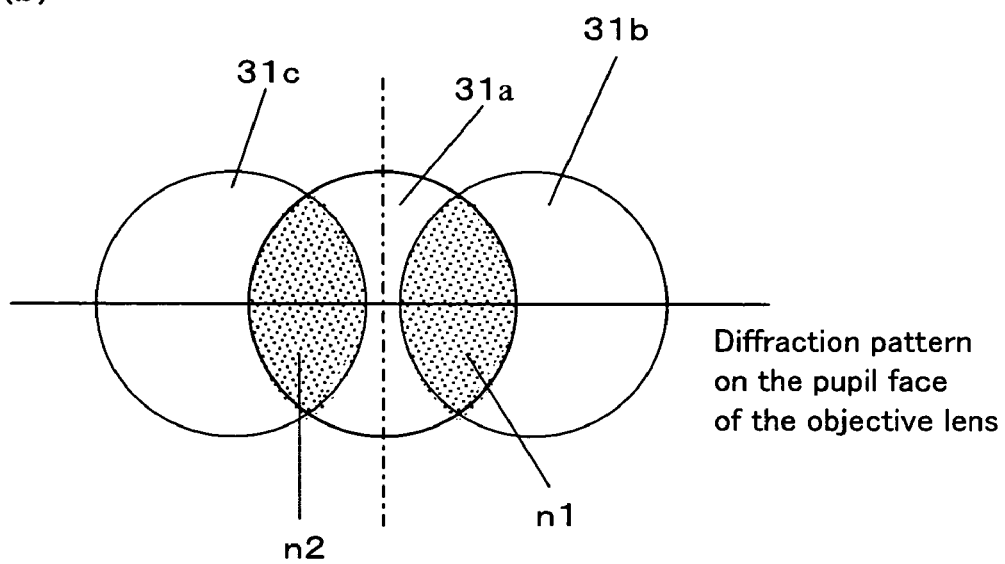
FIG. 2(b) is a plane view showing the diffraction patterns on the pupil face of an objective lens.

As shown in FIG. 2(a), the sub-beam 31, converged on the track 61 on the optical disk 6, is divided into 0th order diffracted light 31a, +1st order diffracted light 31b, and −1st order diffracted light 31c, and the diffracted light 31a through 31c are reflected, respectively. The 0th order diffracted light 31a, the +1st order diffracted light 31b, and the −1st order diffracted light 31c are interfered with each other in regions n1 and n2 (see FIG. 2(b)) where the diffracted light 31a overlaps 31b and 31c. This allows push-pull patterns (i.e. diffraction patterns) to be generated. In the regions n1 and n2, contrast occurs due to an off-track of a light beam.

The diffracted light of the sub-beam 31 enters into the two-division photodetector 8B via the objective lens 5. More specifically, since the diffracted light of the sub-beam 31 enters into the photodetector 8B as shown in FIG. 3, there will be multiple regions, in which phases are different from each other, on the two-division photodetector 8B. white parts and shaded parts in FIG. 3 correspond to the pattern A and the pattern B, respectively on the diffraction grating 3.

Figure 3:
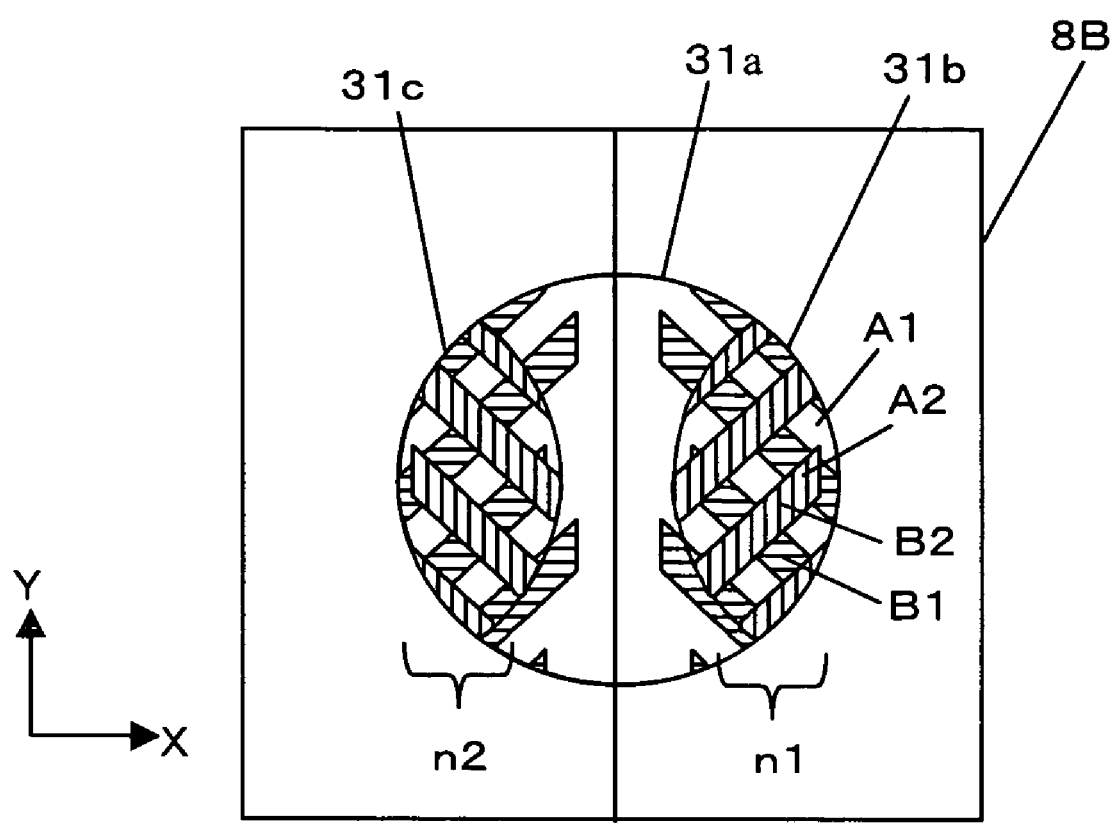
FIG. 3 is a plane view showing diffraction patterns of a beam in the photodetector of the pickup apparatus.

In other words, the shaded parts in FIG. 3 are phase shifted parts which have a phase shift of 180° with respect to the white parts. Thus, in the region n1 on the two-division photodetector 8B, the 0th order diffracted light 31a and the 1st order diffracted light 31b are overlapped so as to cross each other. In the region n2, the 0th order diffracted light 31a and the 1st order diffracted light 31c are overlapped so as to cross.

Therefore, as shown in FIG. 3, the region n1 is classified into four kinds of parts, i.e., a part A1 which is not affected by phase shift, a part A2 in which phase shifted parts are overlapped, a part B1 in which a phase shift is added to the 0th order diffracted light, and a part B2 in which a phase shift is added to the +1th order diffracted light. Since the regions whose phase difference is 180° are overlapped, the PP signal of the part A1, which is not affected from shifted phase, becomes in phase. On the other hand, since the phases of parts B1 and B2 are shifted by 180°, the PP signals in the parts B1 and B2 and the PP signals in the parts A1 and A2 are in opposite phase. This causes reversing of the contrast of the PP signals. In the region n2, similar signals to the region n1 are obtainable.

In the present embodiment, the diffraction grating 3 includes the patterns A and B formed at both sides of the region of the diffraction grating 3 where the light beam passes through so that the patterns A and B are slanted at a predetermined angle in the direction parallel to y-axis of the optical disk. On this account, as shown in FIG. 3, the 0th order diffracted light 31a and the 1st order diffracted light 31b and 31c cross each other on the two-division photodetector 8B when the respective light reflected from the optical disk 6 enter into the objective lens 5. Thus, areas of the parts A1 and A2, not affected by the phase shift, and the parts B1 and B2 in which the respective phases are shifted by 180° become almost equal. As a result, each amplitude of the PP signals from the respective regions n1 and n2 becomes zero (0) in its entirety.

Note that, although the sub-beam 31 is exemplified in the description, the similar description to the sub-beam 31 is also applied to the sub-beam 32.

As shown in FIG. 4, the PP signals 30, 31, and 32 (difference signals) can be obtained from the two-division photodetectors 8A, 8B, 8C, respectively, when the two-division photodetectors 8A, 8B, and 8C receive the far field patterns of reflected beams of the main beam 30, the sub-beams 31 and 32. A PP signal 33, which is the sum of the PP signals 31 and 32 of the respective sub-beams 31 and 32, is obtained. A difference PP signal 34 can be obtained by correcting an offset in the TES of a PP signal 30 of the main beam in accordance with the PP signal 33. Note in FIG. 4 that "k" is the modulus for correcting a difference of the luminous intensities between the main beam 30 and the sub-beam 31 as well as a difference of the luminous intensities between the main beam 30 and the sub-beam 32.

According to the present embodiment, as described with reference to FIG. 3, on the two-division photodetectors 8B and 8C, it is possible by utilizing the diffraction grating 3 that the areas of (i) the parts that are not affected by the phase shift and (ii) the parts that are subject to the phase shift of 180° are substantially equal. Therefore, it is possible to make the amplitude of the PP signal 33 substantially 0, irrespective of the groove depth of the track 61 (see FIG. 2(a)) on the optical disk 6. Thus, it is not necessary to rotate and adjust the diffraction grating 3 so as to carry out a position adjustment of the three beams to be directed onto the track

61. This ensures drastic simplification of adjustments in assembling of the pickup apparatus.

Meanwhile, the reflectance of the track 61 in a recorded region (not shown) of the optical disk 6 is different from that in an unrecorded region. This is because of recorded pits whose reflectance has changed. However, when utilizing a diffraction grating 3 of the present embodiment, each part of spots of the sub-beams 31 and 32, which have been converged on the optical disk 6, is formed on a middle part between the sub-beams 31 and 32, i.e., almost on the same track on which a spot of the main beam is formed. As such, it is possible to suppress the change in DC-like offsets occurred during moving of the light beam from the unrecorded region to the recorded region.

In the meanwhile, in the pickup apparatus, the diffraction grating 3 has a structure in which the pattern A and the pattern B are periodically repeated in the reg1 and the reg3 (FIG. 1(*b*)), respectively, as described earlier. Light beams that have passed through the pattern A and the pattern B, respectively, easily interfere with each other on the pattern borderline, i.e. the parting line of the pattern A and the pattern B. Furthermore, the pattern borderline easily disagrees with the ideal conditions designed of the concavoconvex surface on the diffraction grating 3. As such, in the diffraction patterns on the photodetector 8, it is most likely to change in the luminous intensities in a region corresponding to the pattern borderline.

This change in the luminous intensities affects the amplitude of the PP signals, particularly when the lens shift of the objective lens 5 occurs due to the tracking of the pickup apparatus or the like. More specifically, when the objective lens 5 moves in a direction parallel to x-axis (in a radial direction) of the optical disk 6 in response to the tracking of the pickup apparatus, the relative positions of the light beam and the diffraction grating 3 mismatch. As such, when the sub-beams 31 and 32 are reflected from the optical disk 6, and enter into the two-division photodetectors 8B and 8C, respectively, diffraction patterns are formed on the two-division photodetectors 8B and 8C with being deviated in the direction parallel to x-axis. And, the formation positions of the diffraction patterns change in response to the lens shifting of the objective lens 5 on the two-division photodetectors 8B and 8C, respectively, so as to come across the parting lines, extending in a direction parallel to y-axis, which are located in the middle of the two-division photodetectors 8B and 8C. This causes the positions of the pattern borderlines in the diffraction patterns to change.

In this regard, the diffraction pattern of the region corresponding to the pattern borderline on the diffraction grating 3 (hereinafter referred to as borderline diffraction pattern) may come across the parting lines of the two-division photodetectors 8B and 8C. Under the circumstances, it is likely that the luminous intensities of diffraction patterns obtained respectively from the two regions, on the respective two-division photodetectors 8B and 8C, which are divided by the parting lines largely change before and after the borderline diffraction pattern passes through the parting lines. In other words, it is likely that the difference between the luminous intensity of the diffraction pattern obtained in one of the regions that are divided by the parting lines on the two-division photodetectors 8B and 8C and the luminous intensity of the diffraction pattern obtained in the other of the regions largely change before and after the borderline diffraction pattern passes the parting line.

Figure 18:
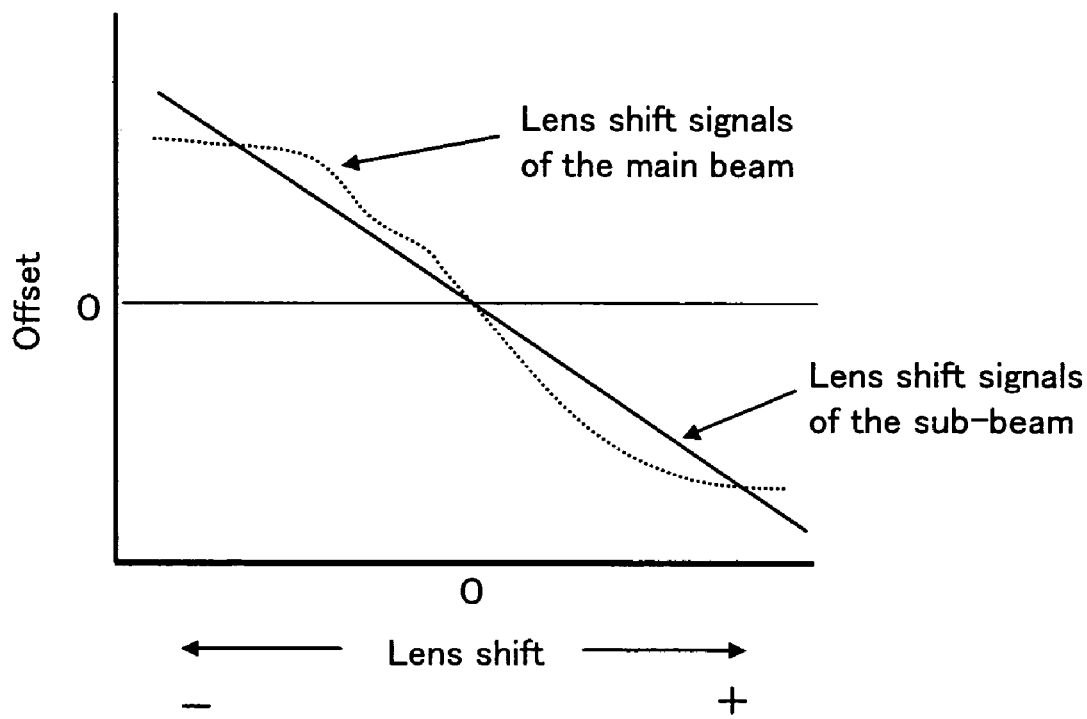
FIG. 18 is a graph showing offset amount of a sub-beam with respect to lens shift of an objective lens in a conventional pickup apparatus.

When the luminous intensities largely change, PP signals of the sub-beams 31 and 32 do not linearly change with respect to a lens shift (see FIG. 18). The PP signals become lens shift signals of the lens shift of the objective lens 5. The large change in the differences of the luminous intensities is dependent on the amount of the borderline diffraction patterns that simultaneously cross the parting lines on the two-division photodetectors 8B and 8C. In other words, the more the borderline diffraction pattern and the parting line overlap each other, the larger the difference of the luminous intensities is. As such, when the overlapping of the borderline diffraction pattern and the parting line rapidly increases, the amplitude of the PP signal rapidly changes before and after the borderline diffraction pattern crosses the parting line (see FIG. 18).

In view of the circumstances, according to the present embodiment, among the pattern borderlines of the diffraction grating 3, the y-axis parallel borderlines, parallel to the y-axis, between the pattern A and the pattern B are not arranged on the regional borderline parallel to the y-axis, but are arranged so as to deviate, in the direction parallel to the x-axis, from the regional borderline. Note that the y-axis parallel borderlines are likely to overlap with the parting lines of the two-division photodetectors 8B and 8C due to the lens shift of the objective lens 5.

Therefore, even when a lens shift of the objective lens 5 occurs, it is possible to avoid that the overlapping of (i) the diffraction pattern in the region corresponding to the y-axis parallel borderline (hereinafter referred to as y-axis border diffraction pattern) and (ii) the parting lines of the two-division photodetectors 8B and 8C rapidly increases. In other words, the utilization of the diffraction grating 3 allows the y-axis border diffraction patterns to cross the parting lines of the two-division photodetectors 8B and 8C in a dispersed manner. As such, the overlapping of the y-axis border diffraction patterns and the parting lines increases gradually. The amplitude of the PP signal gradually change, accordingly.

Figure 19:
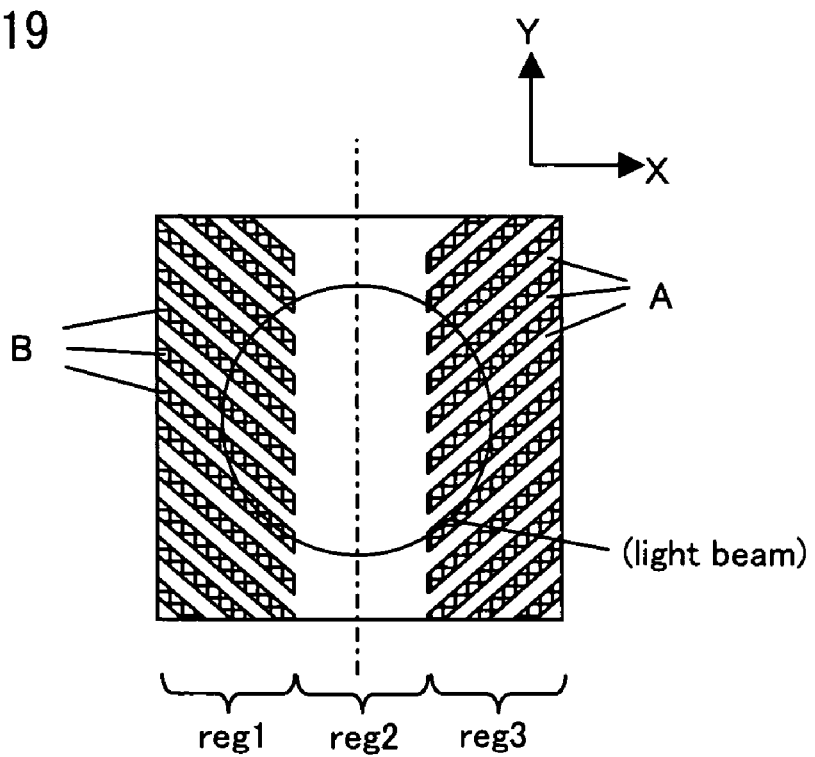
FIG. 19 is a plane view showing another diffraction grating.
Figure 20A:
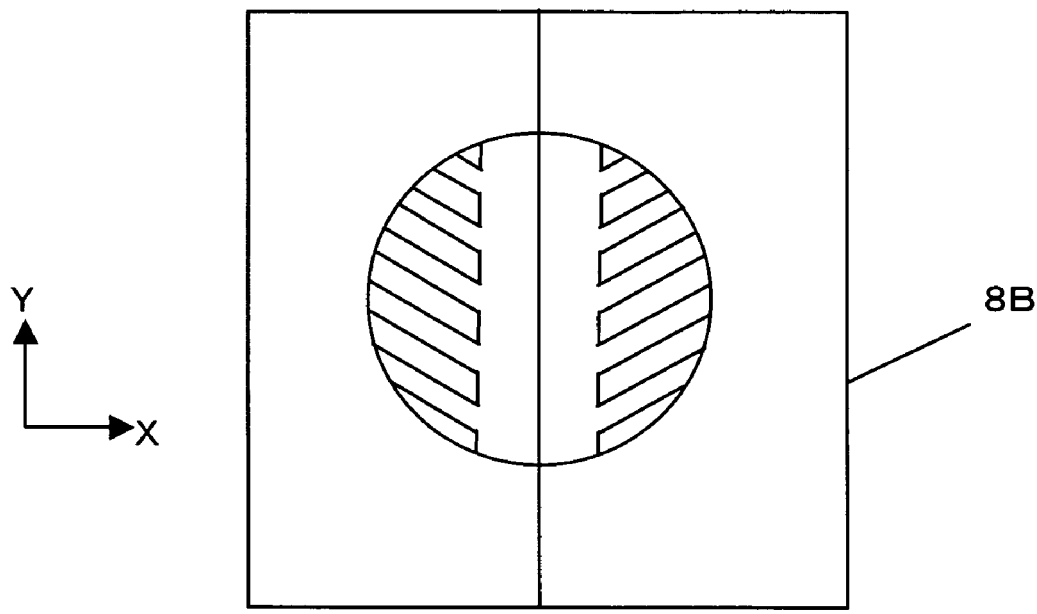
FIG. 20(a) is a plane view showing a diffraction pattern of a beam on a photodetector in case of utilizing the diffraction grating shown in FIG. 19.
Figure 20B:
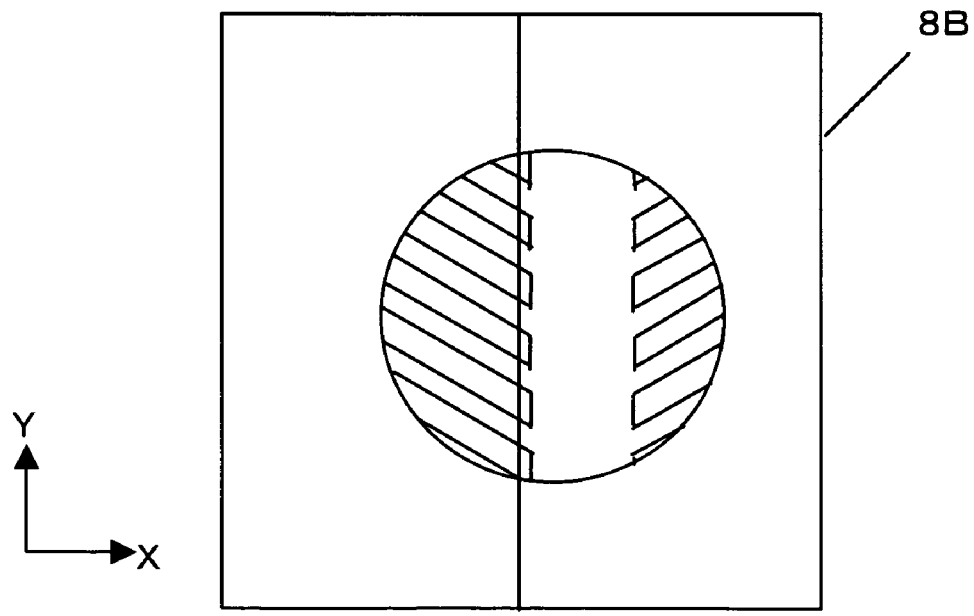
FIG. 20(b) is a plane view showing a diffraction pattern of a beam on a photodetector when the objective lens has lens shift.

To put it differently, if a diffraction grating on which the y-axis parallel border lines are aligned on the regional borderlines as shown in FIG. 19, then y-axis border diffraction patterns, which are aligned on straight lines in parallel to the parting line of the two-division photodetector 8B (see FIG. 20(*a*)), are formed on the two-division photodetector 8B. As such, if the objective lens 5 shifts, then the entire y-axis border diffraction patterns will simultaneously cross the parting line of the two-division photodetector 8B (see FIG. 20(*b*)).

Figure 5:
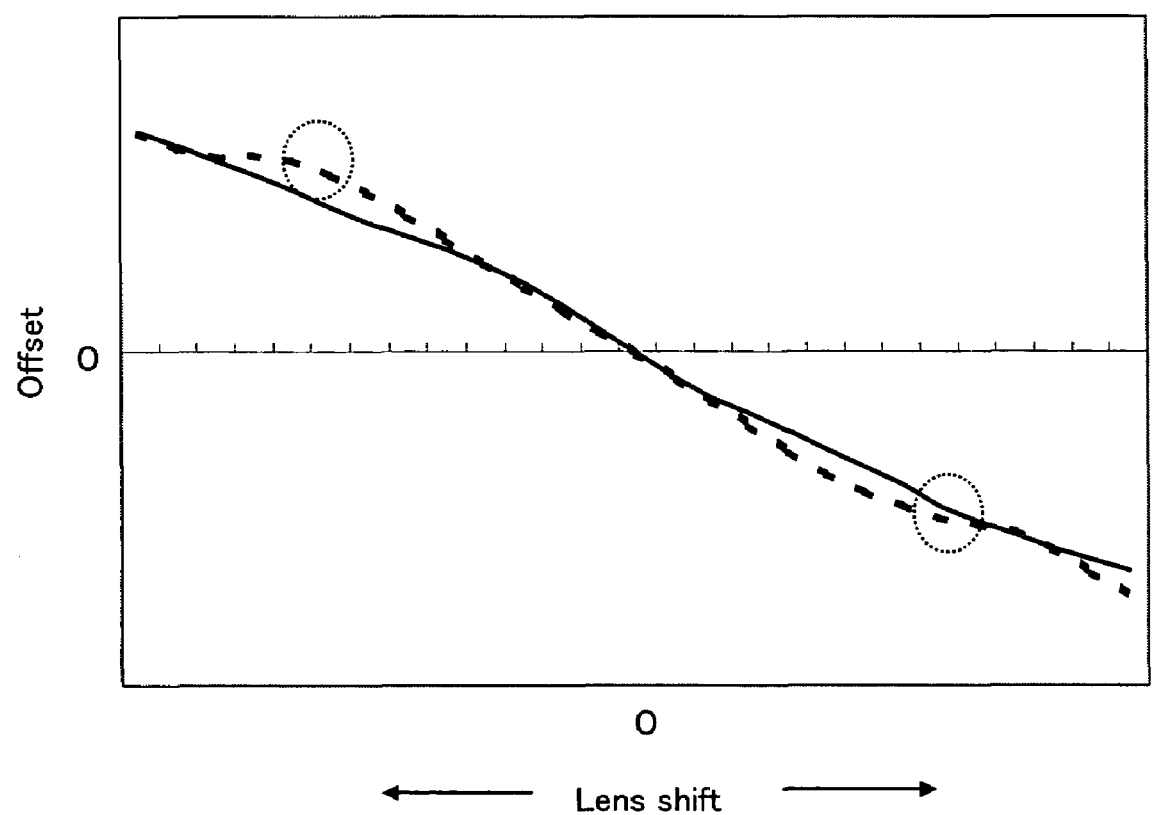
FIG. 5 is a graph showing offset amount of a sub-beam with respect to lens shift of an objective lens in case of utilizing the diffraction grating.

In such a case, the offset value changes as plotted by the dotted line in FIG. 5, if the center values of respective PP signals are used as the respective offset values to evaluate the offset sensitivity with respect to the lens shift of the objective lens 5. Thus, the utilization of the diffraction grating with the structure shown in FIG. 19 causes the offset sensitivity to change non-linearly during the crossing of the y-axis border diffraction pattern with respect to the parting line (the area indicated by the dotted circle in FIG. 5).

In contrast, as described earlier, the utilization of the diffraction grating 3 (FIG. 1(*b*)) of the present embodiment allows the y-axis border diffraction patterns to cross the parting lines of the two-division photodetectors 8B and 8C in a dispersed manner. As such, the offset value of the PP signals changes as plotted by the solid line in FIG. 5. In FIG. 5, the non-linear change (distortion) in the offset value plotted by the solid line is more effectively restrained than that of the dotted line, particularly around the area indicated by the dotted circle in FIG. 5.

As described above, the less the y-axis border diffraction patterns and the parting lines of the two-division photodetectors 8B and 8C overlap each other during the shifting of the objective lens 5, the more effectively the rapid change in the offset sensitivity of the obtained PP signals can be suppressed.

Note that, in the present embodiment, the diffraction grating 3, which has the structure of concavo-convex surface (grating grooves) as shown in FIG. 1(b), is used. However, the present invention is not limited to this. Alternatively, for example, a diffraction grating may be used in which no borderline, which is parallel to the y-axis, of pattern A and pattern B is formed (see FIG. 6 and FIG. 7).

Figure 6:
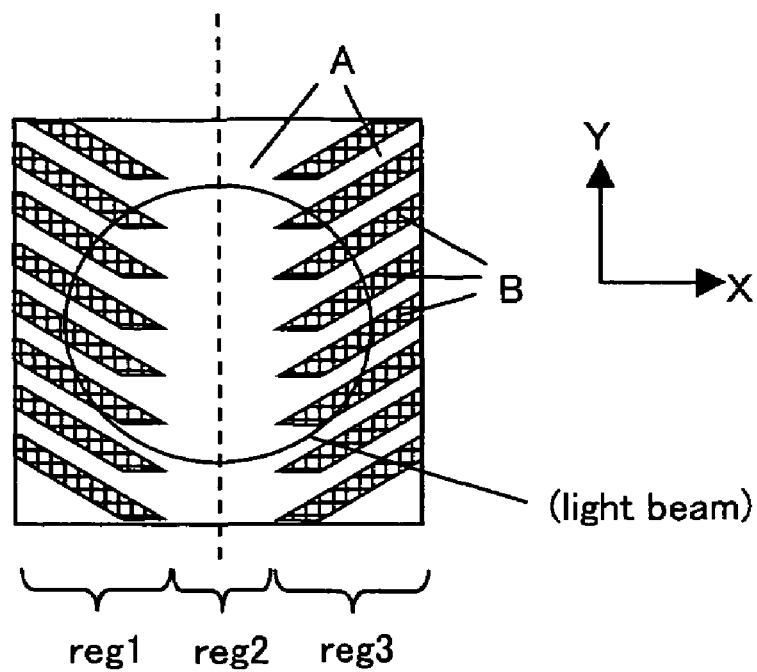
FIG. 6 is a plane view showing another diffraction grating of the first embodiment.

More specifically, according to the diffraction grating shown in FIG. 6, each of the patterns B in first and third regions (reg1 and reg3) is arranged so as to have an acuminate leading end that is closer to a borderline between the first and second regions or a borderline between the second and third regions. As such, the borderlines between the patterns A and patterns B (concavo-convex pattern borderline section) in the reg2 and reg1 and in the reg2 and reg3 are the apexes (apex section) of the acuminate leading end of the respective patterns B. These apexes are arranged on the regional borderlines parallel to the track direction (the direction parallel to y-axis) of the optical disk.

As such, when the diffraction patterns, corresponding to the pattern borderlines between the patterns A and the patterns B (borderline diffraction pattern), simultaneously cross the parting line of the two-division photodetector due to the lens shift of the objective lens, first, the overlapping occurs at the regions corresponding to the respective apexes (point overlapping section). Then, the overlapping of the border diffraction patterns and the parting line gradually increases in response to the lens shift of the objective lens. Thus, it is possible to restrain the rapid increase in overlapping of the borderline diffraction patterns and the parting line.

As such, as FIG. 6 shows, even if the apexes of the patterns B are arranged on the regional borderline, the straight line parallel to y-axis, the rapid change in the PP signals can be restrained because the overlapping of the borderline diffraction patterns and the parting line occurs at the regions corresponding to the respective apexes. As such, it is possible to make linearly change the offset sensitivity of the PP signals with respect to the lens shift.

Figure 7:
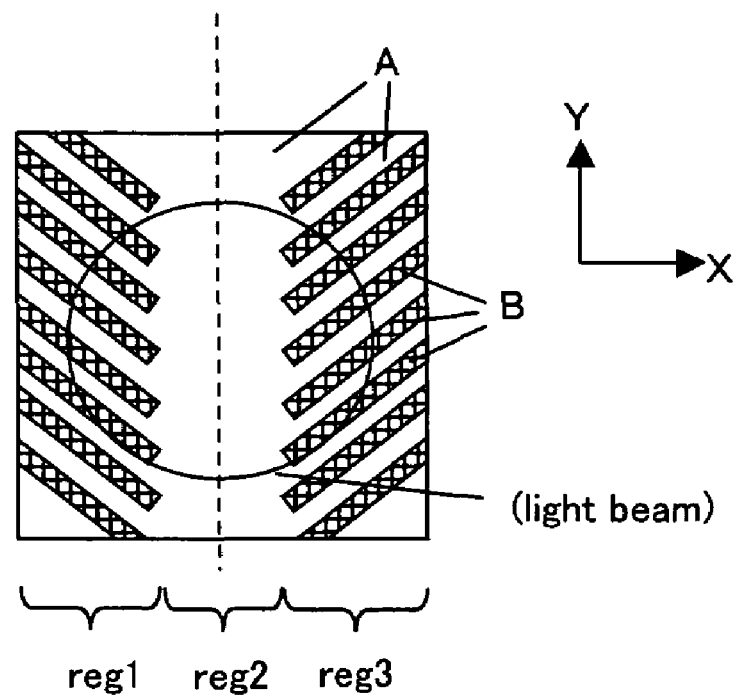
FIG. 7 is a plane view of a further diffraction grating of the first embodiment.

Alternatively, according to a diffraction grating shown in FIG. 7, pattern borderlines, closer to the border between first and second regions (reg1 and reg2) and to the border between third and second regions (reg3 and reg2), are not arranged so as to be parallel to a track direction (the direction parallel to y-axis) of the optical disk, but arranged so as to be slanted with respect to the track direction. As such, like the diffraction grating shown in FIG. 6, the borderlines between the patterns A and patterns B (concavo-convex pattern borderline section) in the reg2 and reg1 and in the reg2 and reg3 are the apexes (apex section) of the acuminate leading end of the respective patterns B. These apexes are arranged on the regional borderlines parallel to y-axis.

As such, like the arrangement shown in FIG. 6, it is possible that, first, the overlapping occurs at the regions corresponding to the respective apexes, and then, the overlapping of the border diffraction patterns and the parting line gradually increases in response to the lens shift of the objective lens. Thus, it is possible to restrain the rapid change in the offset sensitivity of the PP signals, because the overlapping of the borderline diffraction patterns and the parting line increases not rapidly but gradually.

It should be noted that the apex of the pattern B can be like a corner of a square or a triangle that has a certain apex angle as shown in FIG. 6 or FIG. 7. Alternatively, the apex can be a point of an arc.

As described above, the diffraction grating of the present embodiment is not limited to a specific one, provided that the diffraction grating has a structure of a concavo-convex surface (grating grooves) that makes it possible to restrain the rapid increasing of the overlapping of the borderline diffraction patterns and the parting line. More specifically, such a structure of the concavo-convex surface is obtained by forming a linear overlapping section and/or a point overlapping section. In the linear overlapping section, the regional borderline overlaps a part of y-axis parallel borderlines among pattern borderlines between patterns A and patterns B in a pattern borderline group, the pattern borderline group composed of y-axis parallel borderlines parallel to y-axis. In the point overlapping section, the regional borderline overlaps one point of the pattern borderlines. Note that the diffraction grating may include either one of the linear overlapping section or the point overlapping section. Alternatively, the diffraction grating may include both of the linear overlapping section and the point overlapping section. Alternatively, a diffraction grating that has a combination of the concavo-convex surfaces of the respective gratings shown in FIG. 3, FIG. 6 and FIG. 7 may be used.

Among others, as shown in FIG. 6 and FIG. 7, when a diffraction grating is formed so that apexes of the patterns B are linearly on a line that is parallel to the track direction of the optical disk (y-axis), the tendency has been to have less fluctuation in the offset sensitivity of the PP signals with respect to the lens shift in a direction parallel to y-axis. As such, it is possible to improve the reliability of the pickup apparatus, when phase shift patterns to be added to the sub-beams 31 and 32 are changed by (i) a deviation of the luminous intensity in the direction parallel to y-axis due to a deviation of an emission angle at which the laser light is emitted from the light source 1, (ii) assembling errors of the pickup apparatus, or the like.

Moreover, the reg1 to reg3, in the diffraction grating, classified by the shape of the grating patterns and the arrangement of the grating patterns are not limited to the multiple-divided slanted patterns like the diffraction grating shown in FIG. 1(b). Various types of formations are possible. For example, (i) concave sections and convex sections in the patterns A and the patterns B may be formed at an irregular interval, (ii) the patterns A and the patterns B may be formed at an irregular interval, (iii) the reg1 and reg3 are asymmetrically formed, or the like. However, as explained referring to FIG. 3, it is preferable to form respective grating patterns in which an area of the parts that are not affected by the phase shift and an area of the parts that have a phase shift of 180° are equal to each other in the region where the 0th order diffraction light ±1st order diffraction light overlap, among the diffraction patterns caused by the light reflected from the optical disk.

(Embodiment 2)

The following description deals with another embodiment according to the present invention with reference to FIG. 8 through FIG. 11. The same symbols are given to the members that have the same functions as those shown in Figures of the foregoing embodiment 1, and are the descriptions of those members omitted here as a matter of convenience.

Figure 8:
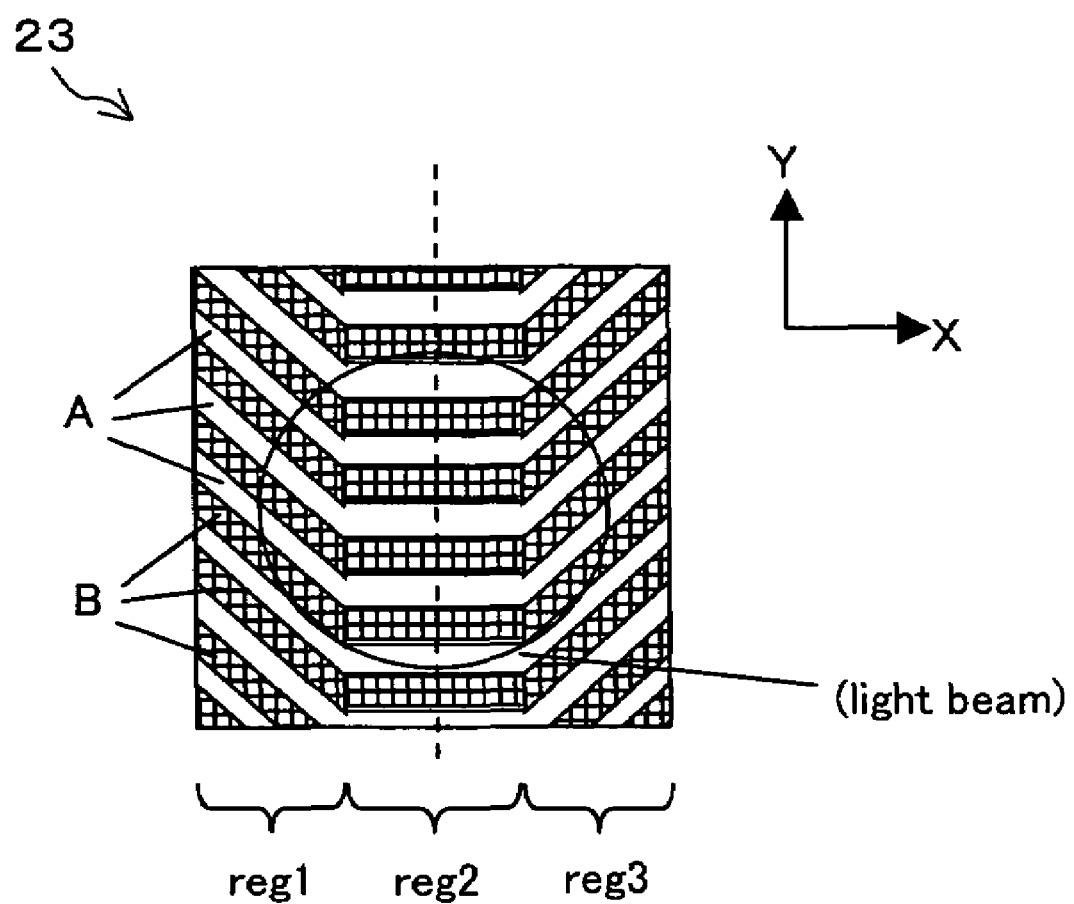
FIG. 8 is a plane view of a diffraction grating of a second embodiment.

A pickup apparatus of the present embodiment utilizes a diffraction grating 23 shown in FIG. 8 instead of the diffraction grating 3 in the foregoing embodiment 1. The diffraction grating 23 includes the patterns A and patterns B of the embodiment 1 as grating patterns, and first through third regions (reg1, reg2, and reg3) are arranged in a direction perpendicular to a direction parallel to y-axis (track direction). The reg1 to reg3 are classified by allocation patterns of the patterns A and B. In these regions, the patterns A and the patterns B are alternately formed in a striped manner substantially at an equal interval.

As shown in FIG. 8, the patterns A and the patterns B in the reg1 and the reg3 are formed so as to be slanted at a predetermined angles with respect to the direction parallel to y-axis of the optical disk 6 (FIG. 1(a)). In the reg1 and reg3, the patterns A and B are slanted in respective opposite directions, and are almost symmetrical with respect to the reg2. The reg1 and the reg3 are located at both sides of the region of the diffraction grating 23 where the light beam passes through.

On the other hand, the reg2 is located between the reg1 and the reg3, i.e., the central region other than the sides of the region of the diffraction grating 23 where the light beam passes through. The patterns A and B in the reg2 are, as shown in FIG. 8, formed in a direction perpendicular to the direction parallel to y-axis (track direction), i.e., in a direction parallel to x-axis (radial direction), in a striped manner. The patterns A and B in the reg2 are formed so as to correspond to the concavo-convex surface (grating grooves) of the patterns A and B in the reg1 and the reg3, respectively, at a borderline between the reg1 and the reg2, and at a borderline between reg2 and reg3.

As such, among concavo-convex pattern borderlines, parallel to y-axis, between the patterns A and the patterns B, no y-axis parallel borderline, in the direction parallel to y-axis, is formed around a borderline, in the reg1, between the reg1 and the reg2 and around a borderline, in the reg3, between the reg3 and the reg2. This is unlike the diffraction gratings described in the embodiment 1. In other words, since the regional borderlines formed at respective borders of the reg1 through reg3 cross the concavo-convex pattern borderlines that extend substantially in a direction parallel to x-axis, each of the regional borderlines overlaps at a point of each of the concavo-convex pattern borderlines. In this way, the regional borderline and the point (not the line) of the concavo-convex pattern borderline overlap (point overlapping section).

Figure 9:
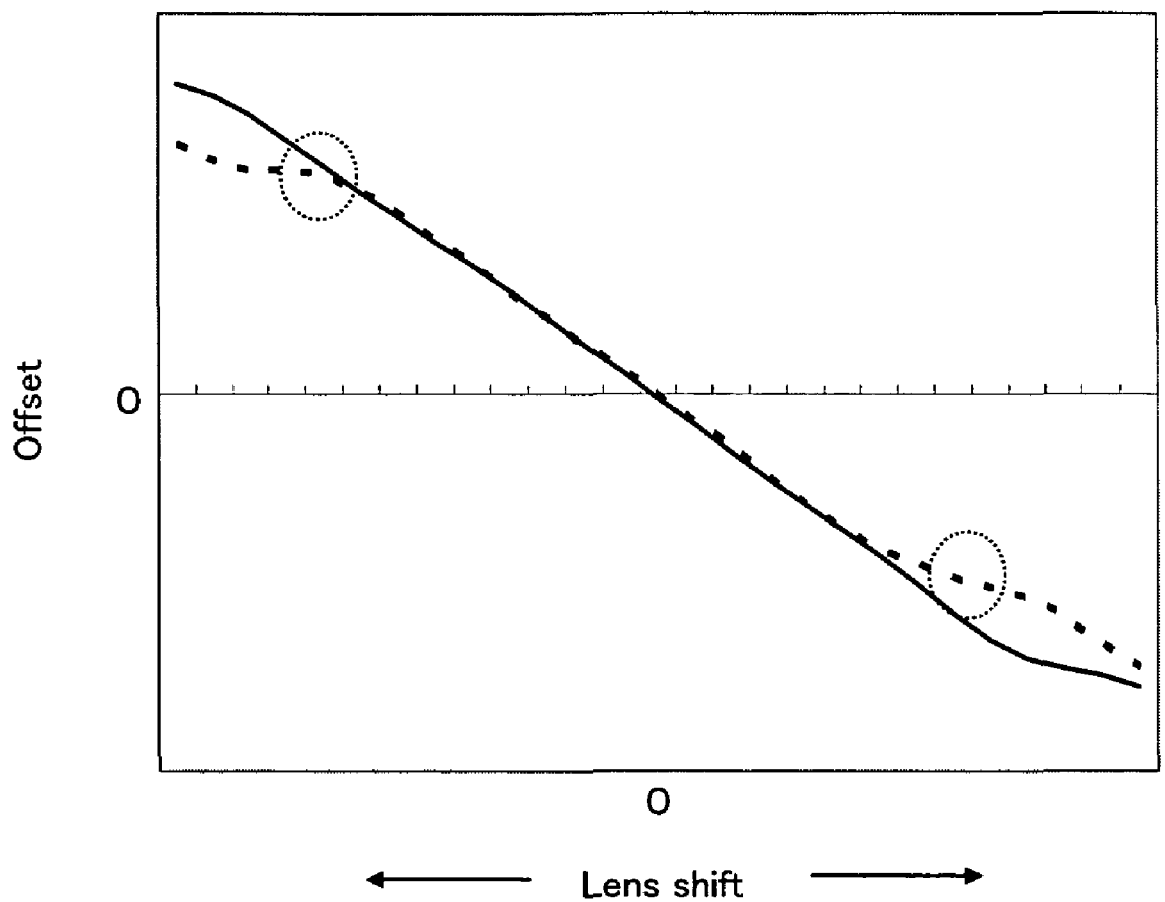
FIG. 9 is a graph showing offset amount of a sub-beam for lens shift of an objective lens in case of utilizing the diffraction grating.

Therefore, it is possible to suppress the rapid increasing of the overlapping of (i) border diffraction pattern corresponding to the concavo-convex pattern borderline and (ii) the parting lines of the two-division photodetectors. This causes the PP signals to change more linearly with respect to the lens shift (see a solid line in FIG. 9) as compared with the case where the diffraction grating described in the embodiment 1 is adopted (see a dotted line in FIG. 9), when detecting a tracking error signal (TES) in a pickup apparatus including the diffraction grating 23. Note that the curve of the PP signal plotted by the solid line in FIG. 9 is equal to the one plotted by the dotted line in FIG. 5.

Namely, even when the patterns of phase shift to be added to the sub-beams 31 and 32 change in response to a deviation of a light beam (diffraction pattern) on the photodetector 8 in the direction parallel to y-axis due to (i) a change in optical parameters of the pickup apparatus shown in FIG. 1(a), (ii) a change in the sizes of the photodetector 8, (iii) an occurrence of errors during assembling of the pickup apparatus, (iv) an angle at which the laser light is emitted from the light source 1, or the like, it is possible to further suppress the non-linear changing of the PP signals, as compared with the pickup apparatus of the embodiment 1.

Figure 10:
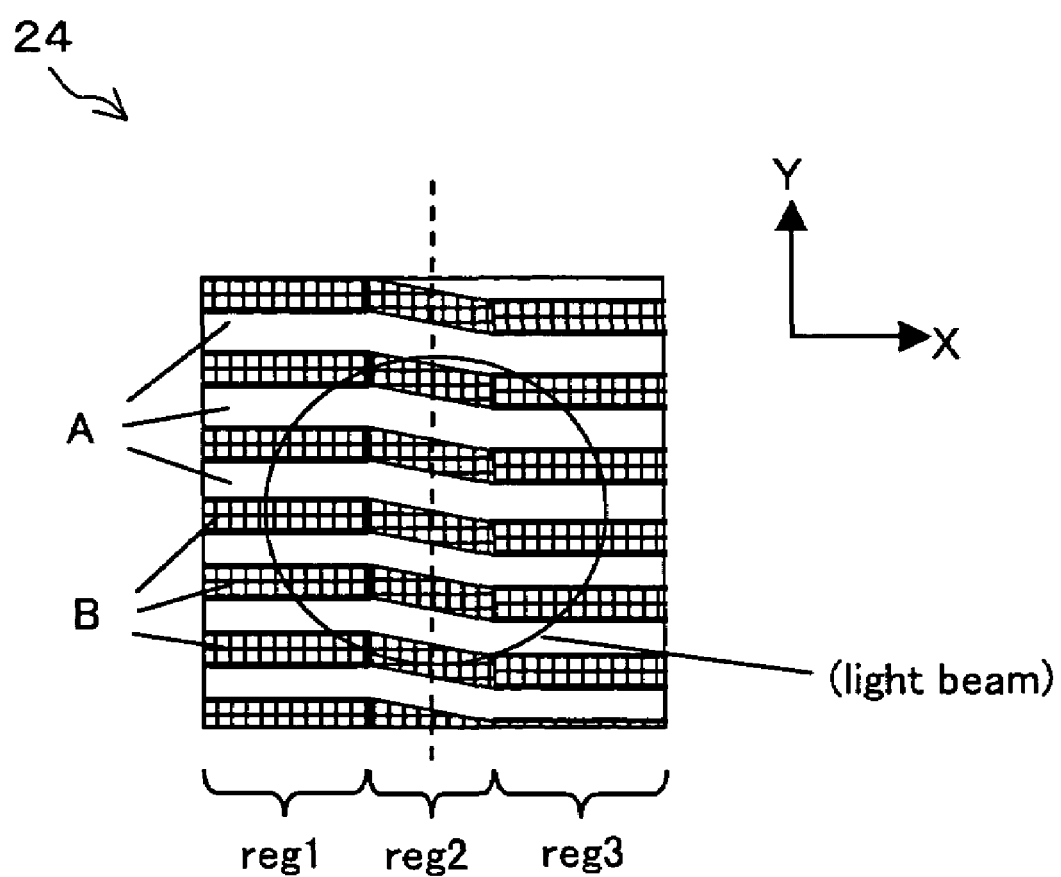
FIG. 10 is a plane view showing another diffraction grating of the second embodiment.

Alternatively, the pickup apparatus of the present embodiment can also utilize a diffraction grating 24 shown in FIG. 10. Like the diffraction grating 23 shown in FIG. 8, the diffraction grating 24 shown in FIG. 10 includes patterns A and patterns B as the grating patterns. The diffraction gratin 24 includes first through third regions (reg1, reg2 and reg3) aligned in a direction perpendicular to y-axis (track direction). The reg1 through reg3 are classified by allocation patterns of the patterns A and the patterns B. In these regions, the patterns A and the patterns B are alternately formed substantially at an equal interval in a striped manner.

More specifically, the patterns A and B in the respective reg1 and reg2 are, as shown in FIG. 10, formed in a striped manner, in a direction perpendicular to the y-axis, that is, in a direction parallel to the x-axis. The patterns A and B in the reg1 are formed so as to respectively deviate, in the direction parallel to y-axis, from those in the reg3. These reg1 and reg3 are located at both sides of the region of the diffraction grating 23 where the light beam passes through.

On the other hand, the reg2 is located between the reg1 and the reg3, i.e., the central region other than the sides of the region of the diffraction grating 23 where the light beam passes through. The patterns A and B in the reg2 are, as shown in FIG. 10, formed at a certain angle with respect to the direction parallel to the y-axis so as to correspond to the concavo-convex surface (grating grooves) of the patterns A and B in the reg1 and the reg3, respectively, at a borderline part between the reg1 and the reg2 and at a borderline part between the reg2 and the reg3.

As such, like the diffraction grating 23 shown in FIG. 8, according to the diffraction grating 24, no y-axis parallel borderline, in the direction parallel to y-axis, is formed around a borderline, in the reg1, between the reg1 and the reg2 and around a borderline, in the reg3, between the reg3 and the reg2. In other words, since the regional borderlines formed at respective borders of the reg1 through reg3 cross the concavo-convex pattern borderlines that extend substantially in a direction parallel to x-axis, each of the regional borderlines overlaps at a point of each of the concavo-convex pattern borderlines. In this way, the regional borderline and the point (not the line) of the concavo-convex pattern borderline overlap (point overlapping section).

Therefore, it is possible to suppress the rapid increasing of the overlapping of (i) border diffraction pattern corresponding to the concavo-convex pattern borderline and (ii) the parting lines of the two-division photodetectors. This causes the PP signals to change more linearly with respect to the lens shift, when detecting a tracking error signal (TES) in a pickup apparatus including the diffraction grating 24, like the case where a pickup apparatus includes the diffraction grating 23.

Figure 11:
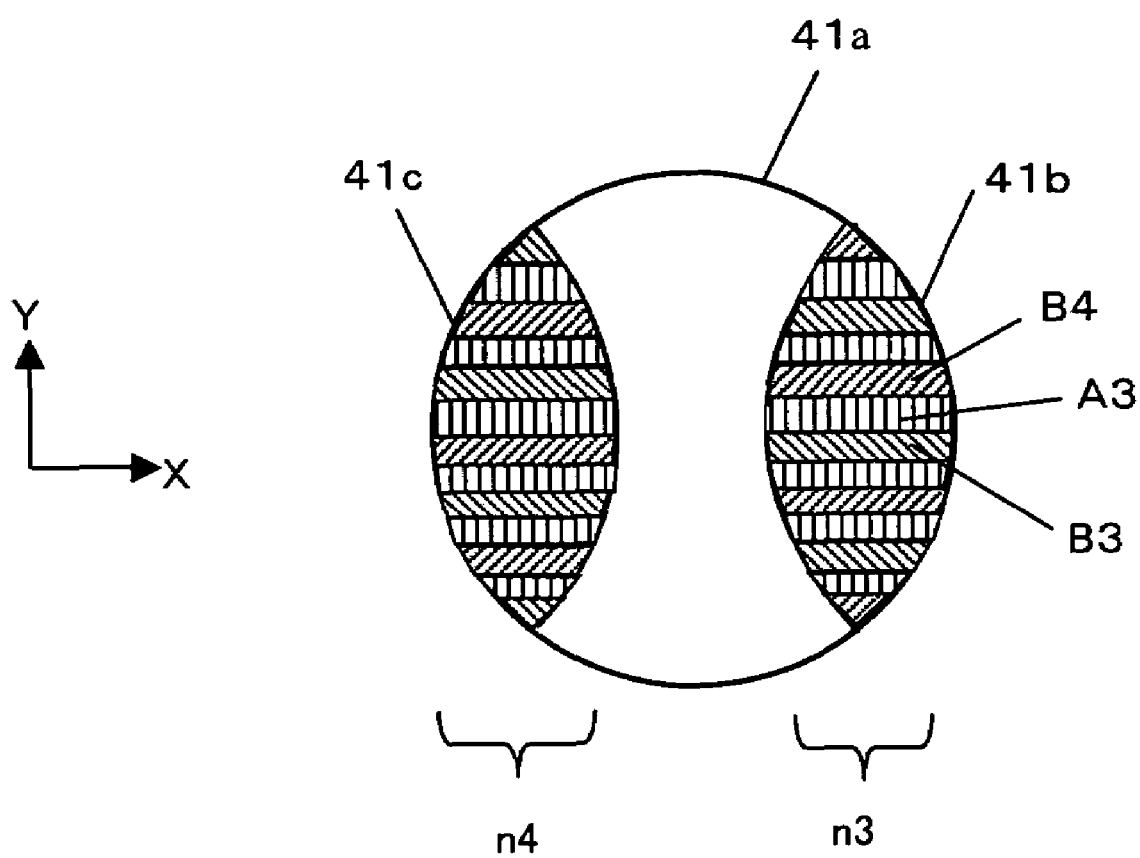
FIG. 11 is a plane view showing diffraction patterns of a beam in a photodetector in case of utilizing the diffraction grating shown in FIG. 10.

Furthermore, as shown in FIG. 11, when the diffraction grating 24 is used, the diffraction patterns of the sub-beams, converged on the track 61 of the optical disk 6 shown in FIG. 1(a), on the photodetector interfere with each other in regions n3 and n4 in which the 0th order diffraction light 41a and ±1st order diffraction light 41b and 41c overlap each other, among the diffraction patterns caused by the light reflected from the optical disk. FIG. 11 only shows the diffraction light in the regions n3 and n4.

More specifically, the region n3 shown in FIG. 11 is classified into three kinds of parts, parts A3 in which phase shift regions overlap each other, parts B3 in which the phase shift is added to the 0th order diffraction light, and parts B4 in which the phase shift is added to +1st order diffraction light. The part A3 is equivalent to a status in which the phase shift is not affected because the phase shift regions overlap each other. Each of the parts B3 and B4 has a phase shift of 180° with respect to the part A3. As such, in the regions n3 and n4, when areas of the parts A3 substantially equal to the sum of areas of the parts B3 and the parts B4, the amplitude of the PP signals from the sub-beams becomes almost 0.

Thus, when utilizing the grating 23 or 24 in which no y-axis parallel borderline, in the direction parallel to y-axis, is formed around a borderline, in the reg1, between the reg1 and the reg2 and around a borderline, in the reg3, between the reg3 and the reg2, a region borderline and at least one point on the concavo-convex pattern borderline overlap. As such, it is possible to reduce the regions where (i) the border diffraction pattern corresponding to the concavo-convex pattern borderline and (ii) the parting lines of the two-division photodetectors overlap each other. In this way, it is possible to suppress the rapid increasing of the overlapped regions in response to the lens shift of the objective lens.

Thus, it is possible to obtain the effect that is obtained when the diffraction grating of the Embodiment 1 is adopted. It is also possible to make the PP signals change more linearly with respect to the lens shift, as compared with the case where the diffraction grating of the Embodiment 1.

It should be noted that, according to the present embodiment, the patterns A and B in the reg1 and the reg3 respectively correspond to those in the reg2 on the regional borderline between the reg1 and the reg2 and on the regional borderline between the reg2 and the reg3. However, the present invention is not limited to this. For example, at least part of the patterns A and the patterns B in the reg1 and the reg3 may correspond to the patterns A and B in the reg2.

(Embodiment 3)

The following description deals with a further embodiment of the present invention with reference to FIG. 12 through FIG. 15. The same symbols are given to the members that have the same functions as those shown in Figures of the foregoing embodiment 1, and are the descriptions of those members omitted here as a matter of convenience.

Figure 12:
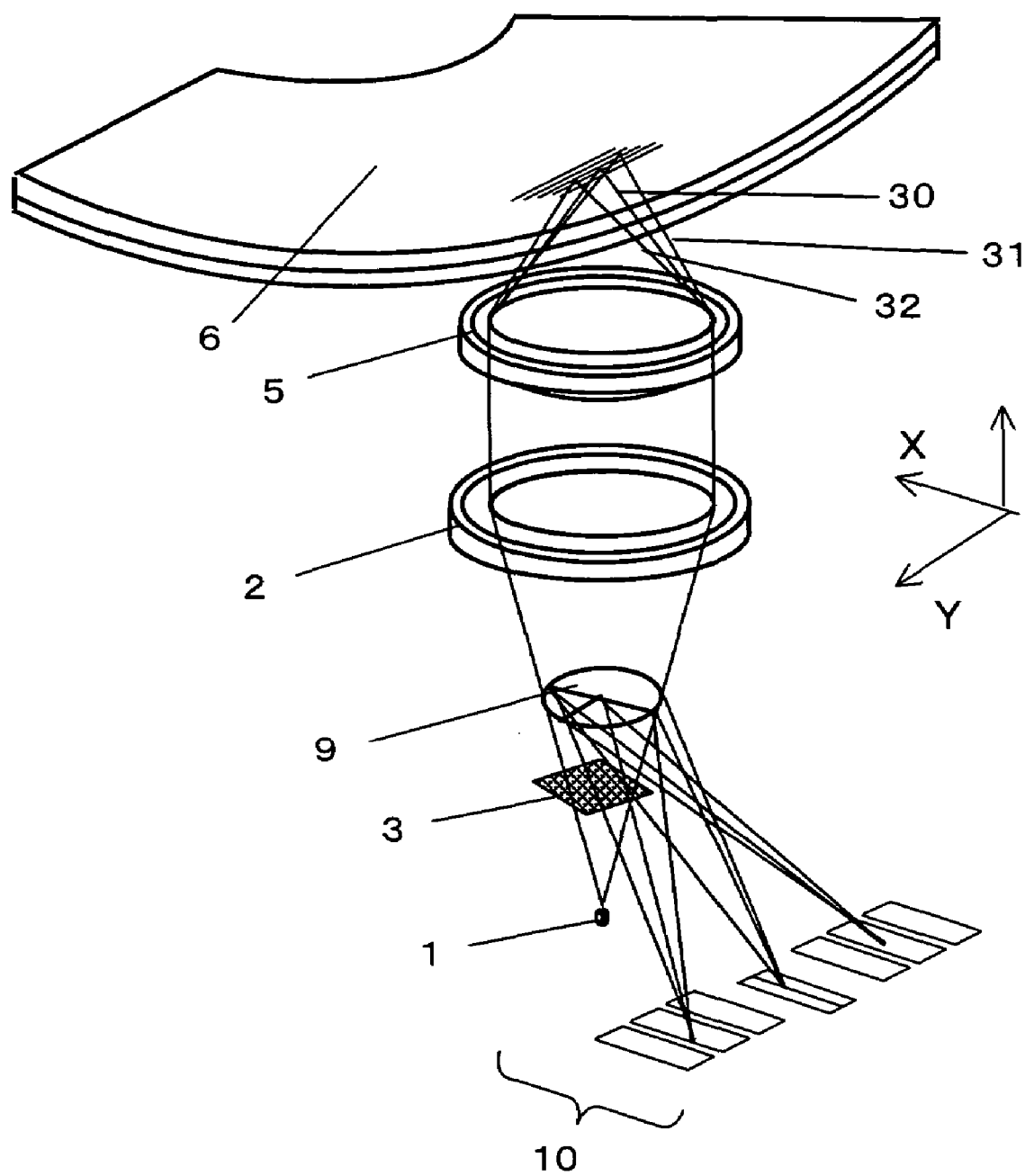
FIG. 12 is a schematic diagram of oblique perspective illustration showing an embodiment of a hologram laser unit which is provided in a pickup apparatus according to the present invention.

As shown in FIG. 12, a pickup apparatus of the present embodiment includes a hologram laser unit. In the hologram laser unit, (i) a diffraction grating 3 serving as a three-beam diffraction grating, (ii) a hologram optical element (hereinafter referred to as HOE) 9, serving as a beam deflection hologram, for generating servo signals, and (iii) a photodetector system including a light receiving element 10 serving as a photodetector are integrated into a single package.

As shown in FIG. 12, in the hologram laser unit, a light beam emitted from the light source 1 is divided in to 3 beams, i.e., a main beam (0th order light) 30, a sub-beam 31 (+1st order light), and a sub-beam 32 (−1st order light). 0th order diffraction light from the HOE 9 is converged onto the optical disk 6 via a collimator lens 2 and the objective lens 5, and the light from the optical disk 6 is diffracted by the HOE 9 so as to be directed to the light receiving element 10.

Figure 13:
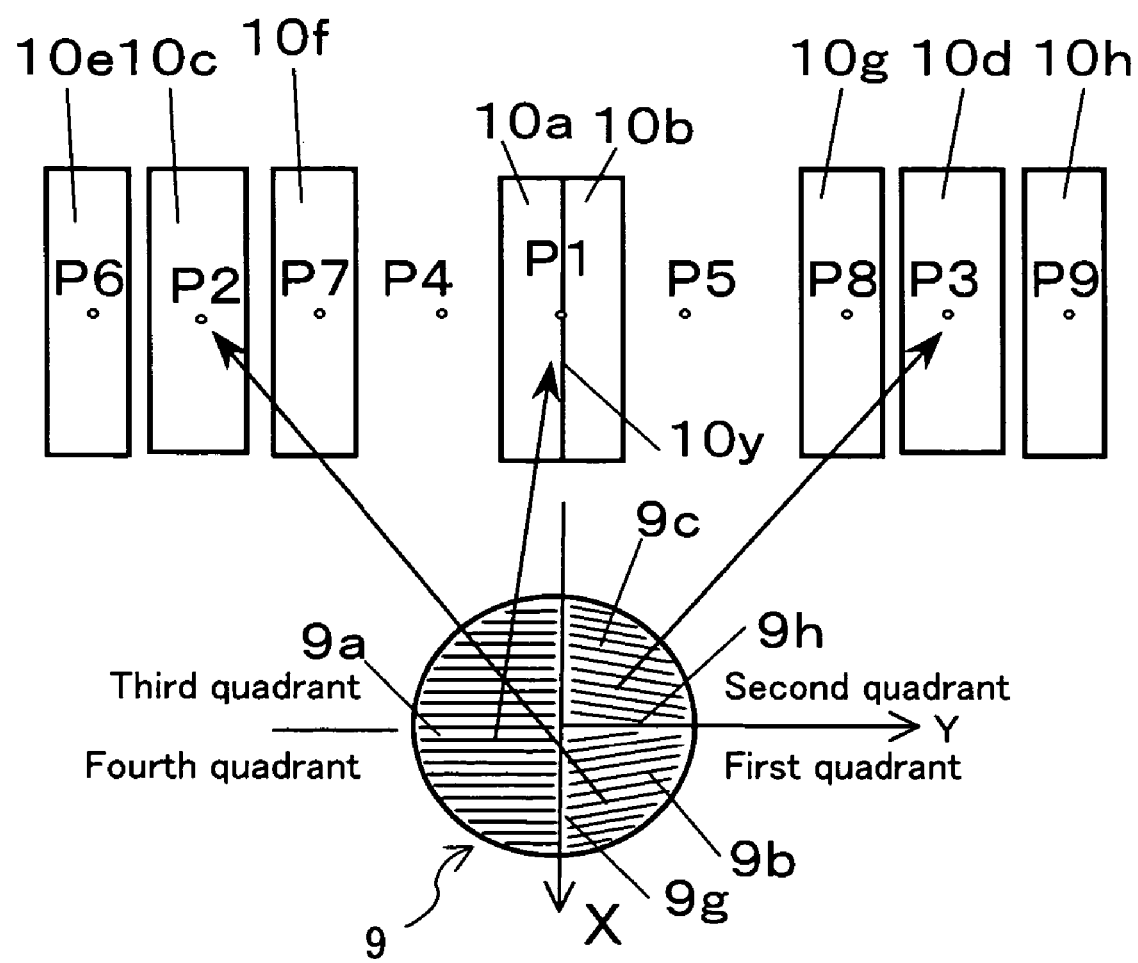
FIG. 13 is a plane view showing a hologram of the hologram laser unit, and a photodetector.

The HOE 9 is, as shown in FIG. 13, divided into 3 parting regions 9a, 9b and 9c by two parting lines 9g and 9h. In the HOE 9, the parting line 9g extends in a radial direction (x-direction) of the optical disk 6, and the parting line 9h extends from the center of the parting line 9g in a y-direction (track direction) orthogonal to the radial direction. The parting regions 9a, 9b, and 9c include respective different gratings. The light receiving element 10 includes two-division light receiving regions 10a and 10b for focusing control, and light receiving regions 10c, 10d, 10e, 10f, 10g, and 10h for tracking control.

According to the hologram laser unit, in focus, the main beam diffracted by the parting region 9a of the HOE 9 forms a beam P1 on a parting line 10y. The main beam 30 is diffracted by the parting regions 9b and 9c so that beams P2 and P3 are formed on the light receiving regions 10c and 10d, respectively.

In addition, ±1st order sub-beams 31 and 32 are respectively diffracted by the parting region 9a so that beams P4 and P5 are formed outside the two-division light receiving regions 10a and 10b, respectively. The ±1st order sub-beams 31 and 32 also are respectively diffracted by the parting regions 9b and 9c so that beams P6 and P7 are formed on the light receiving regions 10e and 10f, respectively, and so that P8 and P9 are formed on the light receiving regions 10g and 10h, respectively.

When it is assumed that Ia and Ib indicate output signals of the two-division light receiving regions 10a and 10b, respectively, and that Ic through Ih indicate the output signals of the light receiving regions 10c through 10h, respectively, a focusing error signal (hereinafter referred to as FES) is found as below, according to the single knife edge method.

$$FES=(Ia-Ib)$$

And TES is found as follows.

$$TES=(Ic-Id)-k((If-Ih)+(Ie-Ig))$$

In the TES, (Ic−Id) indicates a PP signal of the main beam 30. In the TES, (If−Ih) and (Ie−Ig) indicate PP signals of the sub-beams 31 and 32 of the ±1st order light, respectively.

In the present embodiment, the PP signals are obtained from the beams that are diffracted by the parting regions 9b and 9c of the HOE 9. In other words, the present embodiment differs from the Embodiments 1 and 2 in that the light, equivalent to a half of the beam in the embodiments 1 and 2, is utilized. As such, when it is assumed that first quadrant and second quadrant indicate the respective light entering into the parting regions 9b and 9c on the light beam's return route as shown in FIG. 13, it is necessary to make the amplitude of the PP signal be substantially 0 by a subtraction of an optical output of the first quadrant and an optical output of the second quadrant, in order to correct the offset in the TES.

Figure 14:
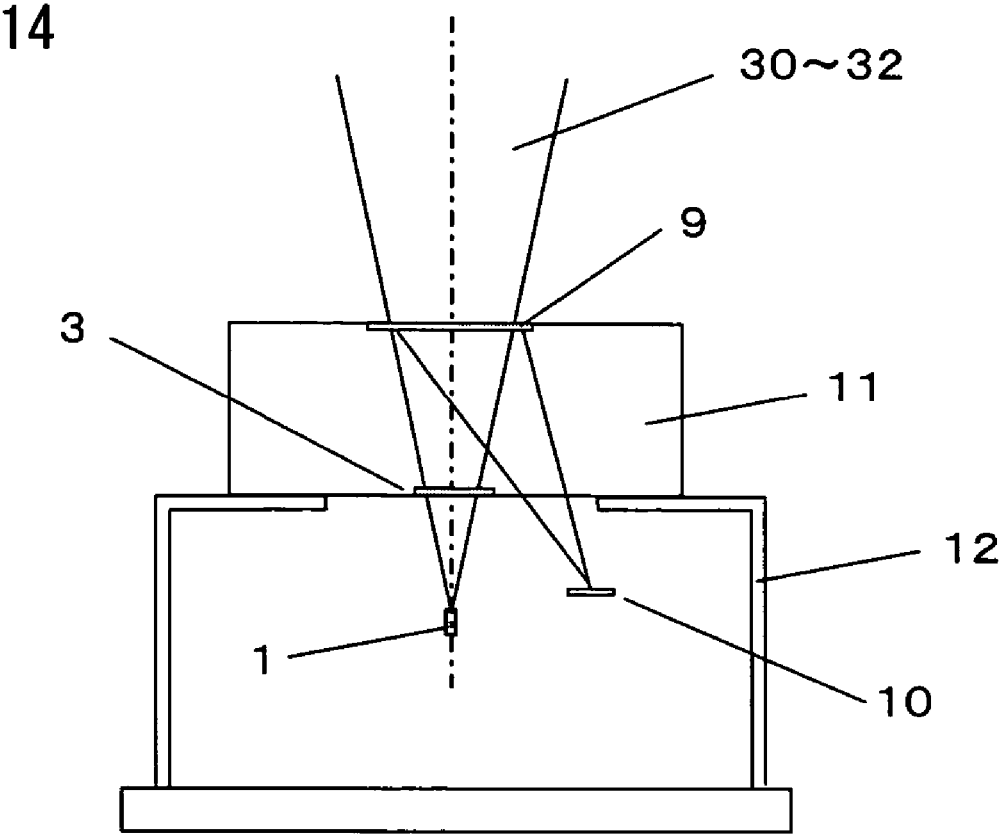
FIG. 14 is a schematic plane view showing the hologram laser unit.
Figure 15:
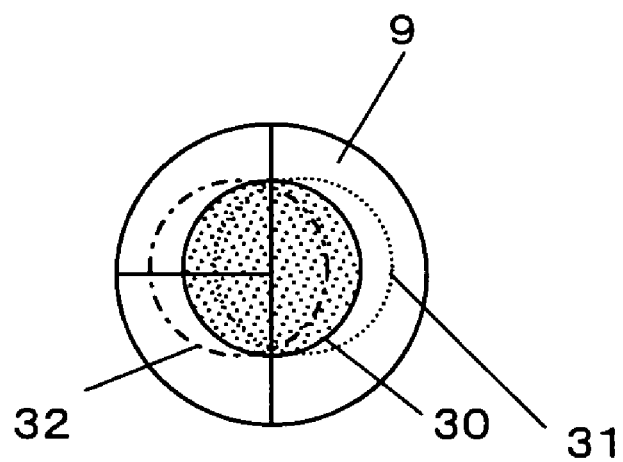
FIG. 15 is a plane view showing beams formed on the hologram.
Figure 16:
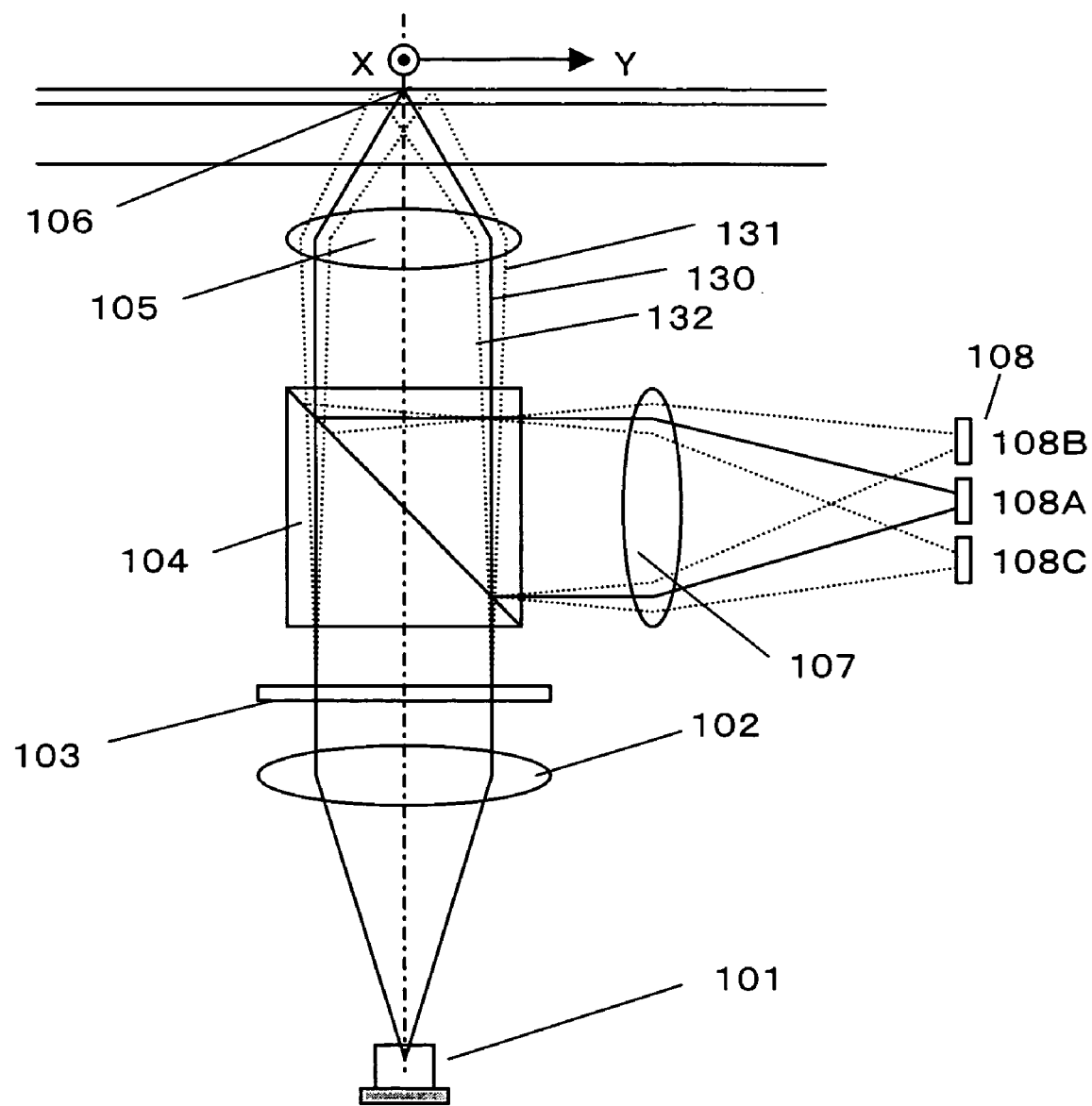
FIG. 16 is a schematic front elevation view showing a conventional pickup.
Figure 17A:
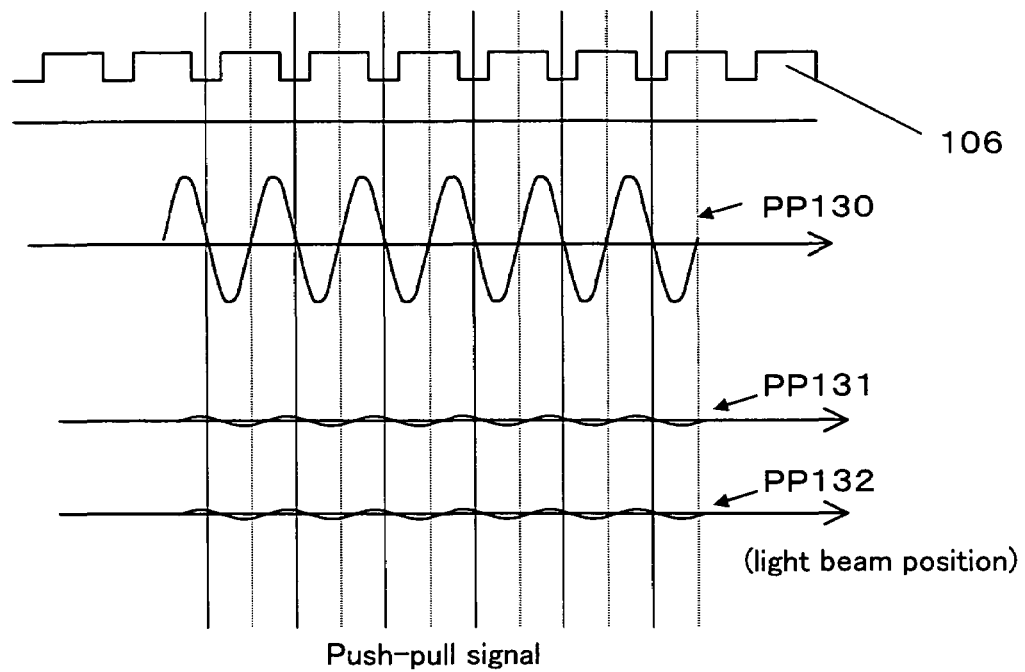
FIG. 17(a) is an explanatory diagram showing PP signals in a conventional phase shift DPP method.
Figure 17B:
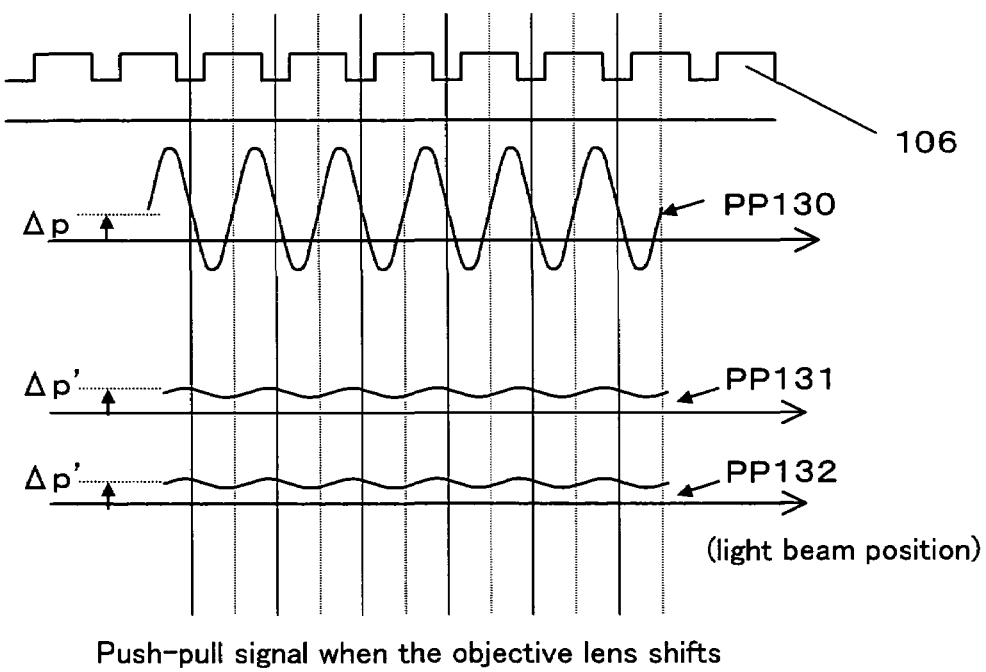
FIG. 17(b) is an explanatory diagram showing the PP signals when an objective lens has lens shift in the phase shift DPP method.

Note that the distance between the light source 1 and the diffraction grating 3 is shortened in the hologram laser unit as shown in FIG. 14. As such, as shown in FIG. 15, actually, parts, of the sub-beams 31 and 32 entering into the objective lens 5, which deviate from the main beam 30 on the HOE 9 are used.

On the HOE 9, the deviation of the parts of the sub-beams 31 and 32 from the main beam 30 varies depending on the positions of optical axes of the diffraction grating 3 and the HOE 9. An integrated and downsized hologram laser unit or the like has a relatively large deviation. In cases where the deviation is vanishingly small as compared with a diameter of the main beam 30, the supplying of a phase difference distribution to the center of the optical axis can be regarded as a same phase distribution is added to the ±1st order light beams, respectively. On the other hand, it is necessary to appropriately designing of the patterns A and B on the diffraction grating 3, in cases where the deviation is relatively large.

In the hologram laser unit, a borderline extending in the y-direction on the HOE 9 corresponds to the borderline on the two-division photodetector in the Embodiments 1 and 2. As such, in the hologram laser unit, the border section between the pattern A and the pattern B in the sub-beams 31 and 32 shifts on the HOE 9 in the x-direction in response to the lens shift of the objective lens 5. Therefore, utilization of the diffraction grating 3 restrains the rapid change in the PP signals before and after the border section crosses the parting line, extending in the y-direction, on the HOE 9.

The present embodiment deals with the case in which the diffraction grating 3 is utilized. However the utilization of the diffraction grating shown in FIG. 6, FIG. 7, FIG. 8 or FIG. 10 described in the Embodiment 1 or 2 can also restrain the rapid change in the amplitude of the PP signals.

As described above, in an optical pickup of the present invention, the concavo-convex pattern border sections may be provided so that a part of the pattern borderlines among the pattern borderlines in the pattern borderline group deviates, in a direction perpendicular to the track direction, from other pattern borderlines in the pattern borderline group.

With the arrangement, in the concavo-convex pattern border sections in which part of the pattern borderlines in the pattern borderline group and the region borderline overlap, each pattern borderline is formed so as to deviate in the direction perpendicular to the track direction from a desired position. As such, it is possible to reduce the overlapping parts of the concavo-convex pattern border sections and the region borderline. Therefore, it is possible to restrain the rapid change in the PP signals even when the converging element is shifted in response to the tracking control so that a deviation (shifting) of the relative position of the converging element and the light receiving element occurs.

Moreover, in the optical pickup of the present invention, the point overlapping section may be an apex of the concavo-convex pattern border section.

With the arrangement, in the concavo-convex pattern border section which is formed so that at least one point on the section and the region borderline overlap, such one point is an apex section of the concavo-convex pattern border section. As such, it is also possible to reduce the overlapping parts of the concavo-convex pattern border sections and the region borderline, thereby restraining the rapid change in the PP signals.

In addition, with the arrangement, it is possible to suppress the non-linear changing of the PP signals for correcting the offset of the tracking error signal, even in the cases of (i) the shifting, in the track direction, of the intensity distribution of the diffracted light received by the light receiving element, (ii) the displacement during assembling of the optical pickup, (iii) the occurrence of the change in patterns of the phase shift to be supplied to the light beam, which occur in response to the shifting of an angle at which the light beam is emitted from the light source.

Alternatively, the optical pickup of the present invention may be arranged as follows. Namely, each of the allocation pattern regions includes the first and second concavo-convex patterns, and at least part of the first and second concavo-convex patterns of the first allocation pattern region are formed so as to correspond to those of the second allocation pattern region.

With the arrangement, it is also possible to reduce the overlapping parts of the concavo-convex pattern border sections and the region borderline. Therefore, it is possible to restrain the non-linear change in the PP signals.

It is possible to restrain the non-linear change in the PP signals, (i) even when the size (area) of the phase shift region, that detects the PP signals for correcting the offset of the tracking error signal, changes in accordance with a change in optical parameters of the pickup apparatus, and in accordance with a change in the sizes of the light receiving element, or (ii) even when the pattern of the phase shift to be supplied to the light beam changes in accordance with the fluctuation in the angles at which the light beam is emitted from the light source.

This permits of realizing of a good tracking servo control, thereby improving the reliability of the tracking servo control with respect to the optical pickup.

The optical pickup of the present invention may be arranged so that the photodetector section includes a hologram, and the photodetector section, the light source, and the optical diffraction element are integrated into a single package so as to form a hologram laser unit.

With the arrangement, it is possible to restrain the non-linear change in the PP signals, even when the tracking error signal is detected by an integrated pickup such as a hologram laser unit in accordance with part of the light beams. Thus, the integrated pickup also permits of realizing of a good tracking servo control, thereby improving the reliability of the tracking servo control with respect to the optical pickup.

The present invention is not limited to the embodiments above, but may be altered within the scope of the claims. An embodiment based on a proper combination of technical means disclosed in different embodiments is encompassed in the technical scope of the present invention.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. An optical pickup, comprising:

a light source for emitting a light beam;

a converging element for converging the light beam onto an optical recording medium;

an optical diffraction element, that is provided between the light source and the converging element, for dividing the light beam into at least a main beam and two sub-beams; and a photodetector section including light receiving elements for respectively receiving light beams divided by a parting line along a track direction of the optical recording medium, said light beams reflected from the optical recording medium;

the optical diffraction element including first concavo-convex patterns, each having a concavo-convex shape with a groove formed in a direction perpendicular to the track direction, and second concavo-convex patterns, each having a concavo-convex shape which deviates from that of the first concavo-convex pattern, the optical diffraction element further including at least first through third allocation pattern regions successively provided in the direction perpendicular to the track direction, the allocation pattern regions being classified in accordance with allocation patterns formed by at least one of the first and second concavo-convex patterns, and when (i) a region borderline, extending parallel to the track direction, which is formed in an allocation pattern border section between the first and second allocation pattern regions provided successively, and (ii) each concavo-convex pattern border section between the first and second concavo-convex patterns overlap, the concavo-convex pattern border sections are provided so that at least one of (1) a linear overlapping section where the region borderline and a part of pattern borderlines in a pattern borderline group in the concavo-convex pattern border sections, each extending parallel to the track direction, overlap, and (2) a point overlapping section where the region borderline and at least one point of the concavo-convex pattern border sections overlap is formed.

2. The optical pickup as set forth in claim 1, wherein the concavo-convex pattern border sections are provided so that a part of the pattern borderlines in the pattern borderline group deviates, in a direction perpendicular to the track direction, from other pattern borderlines in the pattern borderline group.

3. The optical pickup as set forth in claim 1, wherein the point overlapping section is an apex section of the concavo-convex pattern border section.

4. The optical pickup as set forth in claim 1, wherein concave shapes and convex shapes are formed alternately and periodically in each of the first and second concavo-convex patterns, and the concave-convex shapes in the first concave-convex patterns are formed deviating by ½ pitch from those in the second concave-convex patterns.

5. The optical pickup as set forth in claim 1, wherein:
the allocation pattern regions are made up of the first through third allocation pattern regions,
the first allocation pattern region and the third allocation pattern region, adjacent to the second allocation region, respectively include the first and second concavo-convex patterns, and
the second allocation pattern region includes either the first or second concavo-convex patterns.

6. The optical pickup as set forth in claim 5, wherein the first and second concavo-convex patterns of the first and third allocation pattern regions (i) are alternately and periodically formed in the track direction, and (ii) are slanted at a predetermined angle with respect to the track direction.

7. The optical pickup as set forth in claim 6, wherein the first and second concavo-convex patterns of the first allocation pattern region are formed so as to be symmetrical to those of the third allocation pattern region.

8. The optical pickup as set forth in claim 1, wherein each of the allocation pattern regions includes the first and second concavo-convex patterns, and
at least part of the first and second concavo-convex patterns of the first allocation pattern region are formed so as to correspond to those of the second allocation pattern region.

9. The optical pickup as set forth in claim 8, wherein:
the allocation pattern regions are made up of the first through third allocation pattern regions in which the first and second concavo-convex patterns are formed alternately and periodically along a parallel direction to the track,
the first and second concavo-convex patterns of the first allocation pattern region and third allocation pattern region, adjacent to the second allocation pattern region, are formed so as to be slanted at a predetermined angle with respect to the track direction, and
the first and second concavo-convex patterns of the second allocation pattern region are formed along a parallel direction to the track.

10. The optical pickup as set forth in claim 9, wherein the first and second concavo-convex patterns of the first allocation pattern region are formed so as to be symmetrical to those of the third allocation pattern region.

11. The optical pickup as set forth in claim 8, wherein:
the allocation pattern regions are made up of the first through third allocation pattern regions in which the first and second concavo-convex patterns are formed alternately and periodically along a parallel direction to the track,
the first and second concavo-convex patterns of the second allocation pattern region are formed so as to be slanted at a predetermined angle with respect to the track direction, and
the first and second concavo-convex patterns of the first allocation pattern region and the third allocation pattern region, adjacent to the second allocation pattern region, are formed along the parallel direction to the track.

12. The optical pickup as set forth in claim 1 further including a hologram wherein:
the hologram having the parting line along the track direction to divide the reflected light beams, the photodetector section, the light source, and the optical diffraction element are integrated into a single package so as to form a hologram laser unit.

* * * * *